United States Patent
Macaro et al.

(10) Patent No.: US 10,146,741 B2
(45) Date of Patent: Dec. 4, 2018

(54) APPROXIMATE MULTIVARIATE POSTERIOR PROBABILITY DISTRIBUTIONS FROM SIMULATED SAMPLES

(71) Applicant: SAS Institute Inc., Cary, NC (US)

(72) Inventors: Christian Macaro, Raleigh, NC (US); Jan Chvosta, Raleigh, NC (US); Mark Roland Little, Cary, NC (US)

(73) Assignee: SAS INSTITUTE INC., Cary, NC (US)

(*) Notice: Subject to any disclaimer, the term of this patent is extended or adjusted under 35 U.S.C. 154(b) by 1127 days.

(21) Appl. No.: 14/217,858

(22) Filed: Mar. 18, 2014

(65) Prior Publication Data

US 2014/0278239 A1  Sep. 18, 2014

Related U.S. Application Data

(60) Provisional application No. 61/798,245, filed on Mar. 15, 2013, provisional application No. 61/794,242, filed on Mar. 15, 2013.

(51) Int. Cl.
*G06F 17/18* (2006.01)
*G06N 7/00* (2006.01)

(52) U.S. Cl.
CPC .............. *G06F 17/18* (2013.01); *G06N 7/005* (2013.01)

(58) Field of Classification Search
CPC .......... G06F 17/18; G06F 17/17; G06F 19/24; G06N 7/005; G06Q 40/06; G06Q 40/04
USPC ............................................................ 703/2
See application file for complete search history.

(56) References Cited

U.S. PATENT DOCUMENTS

| | | | |
|---|---|---|---|
| 6,192,312 B1 | 2/2001 | Hummelsheim | |
| 2006/0027744 A1* | 2/2006 | Stults ...................... | G06F 19/24 250/288 |
| 2008/0071692 A1* | 3/2008 | Jain .................... | G06Q 30/0601 705/80 |

(Continued)

OTHER PUBLICATIONS

Montiel et. al., A Simulation-Based Approach to Decision Making with Partial Information, Decision Analysis, vol. 9, No. 4, Dec. 2012, pp. 329-347.*

(Continued)

*Primary Examiner* — Aniss Chad
*Assistant Examiner* — Justin C Mikowski

(57) ABSTRACT

Various embodiments are directed to techniques for deriving a sample representation from a random sample. A computer-program product includes instructions to cause a first computing device to fit an empirical distribution function to a marginal probability distribution of a variable within a first sample portion of a random sample to derive a partial marginal probability distribution approximation, wherein the random sample is divided into multiple sample portions distributed among multiple computing devices; fit a first portion of a copula function to a multivariate probability distribution of the first sample portion, wherein the copula function is divided into multiple portions; and transmit an indication of a first likelihood contribution of the first sample portion to a coordinating device to cause a second computing device to fit a second portion of the copula function to a multivariate probability distribution of a second sample portion. Other embodiments are described and claimed.

24 Claims, 10 Drawing Sheets

(56) References Cited

U.S. PATENT DOCUMENTS

| | | | |
|---|---|---|---|
| 2008/0231509 A1* | 9/2008 | Iwamoto | G01S 19/39 342/357.22 |
| 2009/0287623 A1 | 11/2009 | Martin et al. | |
| 2011/0208676 A1* | 8/2011 | Jonas | G06N 7/005 706/10 |
| 2012/0246189 A1* | 9/2012 | Castellanos | G06F 17/18 707/769 |
| 2014/0072094 A1* | 3/2014 | Sierwald | G06T 11/006 378/4 |
| 2014/0358831 A1* | 12/2014 | Adams | G06N 7/005 706/12 |
| 2015/0095415 A1* | 4/2015 | White | G06F 17/30958 709/204 |

OTHER PUBLICATIONS

Montiel et. al., Approximating Joint Probability Distributions Given Partial Information, Decision Analysis, vol. 10, No. 1, Mar. 2013, pp. 26-41, ISSN 1545-8490 (print) . ISSN 1545-8504 (online).*

Silva et. al., Copula, marginal distributions and model selection: a Bayesian note, Stat Comput (2008) 18: 313-320.*

"Simulation of dependent random variables using copulas", The MathWorks, <http://www.mathworks.com/products/demos/statistics/copulademo.html>, 13 pages, Unknown date, Unknown author.

"Distributions, Simulation, and Excel Functions", <http://www.sba.oakland.edu/faculty/isken/hcm540/Session03_DMUncertainty/DistributionsSimulationExcelFunctions.pdf>, 4 pages, Jun. 11, 2013, unknown author.

Wikipedia, "Monte Carlo Method", <http://en.wikipedia.org/wiki/Monte_Carlo_method>, 10 pages, date unknown, author unknown.

"Data Analysis & Simulation", MathWave Technologies, <http://mathwave.com/blog/category/distributions/>, Dec. 2, 2013, 6 pages.

Man, Nguyen, V.M., "Mathematical Modeling and Simulation", Sep. 6, 2010, 70 pages (pp. 1-35).

Man, Nguyen, V.M., "Mathematical Modeling and Simulation", Sep. 6, 2010, 70 pages (pp. 36-70).

"Simulation Tutorial—Models", 2014 Frontline Systems, Inc., <http://www.solver.com/simulation-models>, 2 pages, (Author unknown).

"The mathematics of safe machine intelligence", Machine Intelligence Research Institute, <http://intelligence.org/research/?gclid=CMGlkJGzpb4CFUuXOgodKj4ABw>, 4 pages, (unknown date, unknown author).

Reber et al., "Statistics Applets", <http://www.bbn-school.org/us/math/ap_stats/applets/applets.html>, May 2000, 4 pages.

Ing et al., "Mathematical and Computational Modeling and Simulation", < http://www.informatik.uni-hamburg.de/TIS/downloads/Vorlesung_CMS_2005_3.pdf>, 2005, 285 pages (pp. 1-45).

Ing et al., "Mathematical and Computational Modeling and Simulation", < http://www.informatik.uni-hamburg.de/TIS/downloads/Vorlesung_CMS_2005_3.pdf>, 2005, 285 pages (pp. 46-86 ).

Ing et al., "Mathematical and Computational Modeling and Simulation", < http://www.informatik.uni-hamburg.de/TIS/downloads/Vorlesung_CMS_2005_3.pdf>, 2005, 285 pages (pp. 87-135).

Ing et al., "Mathematical and Computational Modeling and Simulation", < http://www.informatik.uni-hamburg.de/TIS/downloads/Vorlesung_CMS_2005_3.pdf>, 2005, 285 pages (pp. 136-192).

Ing et al., "Mathematical and Computational Modeling and Simulation", < http://www.informatik.uni-hamburg.de/TIS/downloads/Vorlesung_CMS_2005_3.pdf>, 2005, 285 pages (pp. 193-240).

Ing et al., "Mathematical and Computational Modeling and Simulation", < http://www.informatik.uni-hamburg.de/TIS/downloads/Vorlesung_CMS_2005_3.pdf>, 2005, 285 pages (pp. 241-285).

Office Action received for U.S. Appl. No. 14/217,707, dated Sep. 1, 2016, 8 pages.

Raftery et al., "One Long Run with Diagnostics: Implementation Strategies for Markov Chain Monte Carlo", Statistical Science, (1992), 5 pages.

Raftery et al., "The Number of Iterations, Convergence Diagnostics, and Generic Metropolis Algorithms", Chapman & Hall, (1995), 15 pages.

Heidelberger et al., "Simulation Run Length Control in the Presence of an Initial Transient", Operations Research, vol. 31, No. 6, pp. 1109-1144, 1983.

Heidelberger et al., "A Spectral Method for Confidence Interval Generation and Run Length Control in Simulations", Simulation Modeling and Statistical Computing, Communications of the ACM, vol. 24, No. 4, Apr. 1981, 13 pages.

Geweke, J. (1992), "Evaluating the Accuracy of Sampling-Based Approaches to Calculating Posterior Moments," Oxford University Press, vol. 4, 1992, 25 pages.

Venables, W. N., "An Introduction to R", <http://cran.r-project.org/doc/manuals/r-release/R-intro.html>, version 3.1.1 (Jul. 10, 2014), 1990 pp. 1-45.

Venables, W. N., "An Introduction to R", <http://cran.r-project.org/doc/manuals/r-release/R-intro.html>, version 3.1.1 (Jul. 10, 2014), 1990 pp. 46-90.

Venables, W. N., "An Introduction to R", <http://cran.r-project.org/doc/manuals/r-release/R-intro.html>, version 3.1.1 (Jul. 10, 2014), 1990 pp. 91-124.

* cited by examiner

APPROXIMATE MULTIVARIATE POSTERIOR PROBABILITY DISTRIBUTIONS FROM SIMULATED SAMPLES

CROSS-REFERENCE TO RELATED APPLICATIONS

This application claims the benefit of priority under 35 U.S.C. § 119(e) to U.S. Provisional Application Ser. No. 61/794,242 entitled "COMPACT REPRESENTATION OF POSTERIOR SAMPLES WITH ISO-PROBABILITY SURFACE," filed Mar. 15, 2013, the entirety of which is incorporated herein by reference.

This application claims the benefit of priority under 35 U.S.C. § 119(e) to U.S. Provisional Application Ser. No. 61/798,245 entitled "APPROXIMATE REPRESENTATIONS OF MULTIVARIATE POSTERIOR PROBABILITY DISTRIBUTIONS FROM SIMULATED POSTERIOR SAMPLES," filed Mar. 15, 2013, the entirety of which is incorporated herein by reference.

This application is related to U.S. patent application Ser. No 14/217,707 filed concurrently herewith entitled "COMPACT REPRESENTATION OF MULTIVARIATE POSTERIOR PROBABILITY DISTRIBUTION FROM SIMULATED SAMPLES," which is incorporated herein by reference in its entirety.

BACKGROUND

Data incorporating large quantities of variables is becoming increasingly commonplace, especially in data sets that are sufficiently large that they may be generated and/or stored by multiple computing devices. In addition to the challenges of handling such a large quantity of data, increasing the quantity of variables in a data set by even a small degree tends to add exponentially to at least the complexity of relationships among the data values, and may result in an exponential increase in data size. Among such challenging data sets are large random samples generated by various forms of statistical analysis.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

A computer-program product tangibly embodied in a non-transitory machine-readable storage medium, the computer-program product including instructions operable to cause a first computing device to perform operations including fit an empirical distribution function to a marginal probability distribution of a variable within a first sample portion of a random sample to derive a first partial marginal probability distribution approximation, wherein the random sample is divided into a plurality of sample portions comprising the first sample portion and a second sample portion, and wherein the plurality of sample portions is distributed among a plurality of computing devices; fit a first portion of a copula function to a multivariate probability distribution of the first sample portion, wherein the copula function is divided into a plurality of portions comprising the first portion of the copula function and a second portion of the copula function; and transmit an indication of a first likelihood contribution of the first sample portion to a coordinating device to cause a second computing device to fit the second portion of the copula function to a multivariate probability distribution of the second sample portion.

A computer-implemented method comprising fitting, on a first computing device, an empirical distribution function to a marginal probability distribution of a variable within a first sample portion of a random sample to derive a first partial marginal probability distribution approximation, wherein the random sample is divided into a plurality of sample portions comprising the first sample portion and a second sample portion, and wherein the plurality of sample portions is distributed among a plurality of computing devices; fitting, on the first computing device, a first portion of a copula function to a multivariate probability distribution of the first sample portion, wherein the copula function is divided into a plurality of portions comprising the first portion of the copula function and a second portion of the copula function; and transmitting, from the first computing device, an indication of a first likelihood contribution of the first sample portion to a coordinating device to cause a second computing device to fit the second portion of the copula function to a multivariate probability distribution of the second sample portion.

An apparatus comprising a processor component of a first computing device; an empirical function component for execution by the processor component to fit an empirical distribution function to a marginal probability distribution of a variable within a first sample portion of a random sample to derive a first partial marginal probability distribution approximation, wherein the random sample is divided into a plurality of sample portions comprising the first sample portion and a second sample portion, and wherein the plurality of sample portions is distributed among a plurality of computing devices; a copula fitting component for execution by the processor component to fit a first portion of a copula function to a multivariate probability distribution of the first sample portion, wherein the copula function is divided into a plurality of portions comprising the first portion of the copula function and a second portion of the copula function; and a communications component for execution by the processor component to transmit an indication of a first likelihood contribution of the first sample portion to a coordinating device to cause a second computing device to fit the second portion of the copula function to a multivariate probability distribution of the second sample portion.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other features will become apparent from the following detailed description when considered in conjunction with the drawings.

DETAILED DESCRIPTION

Figure 1:
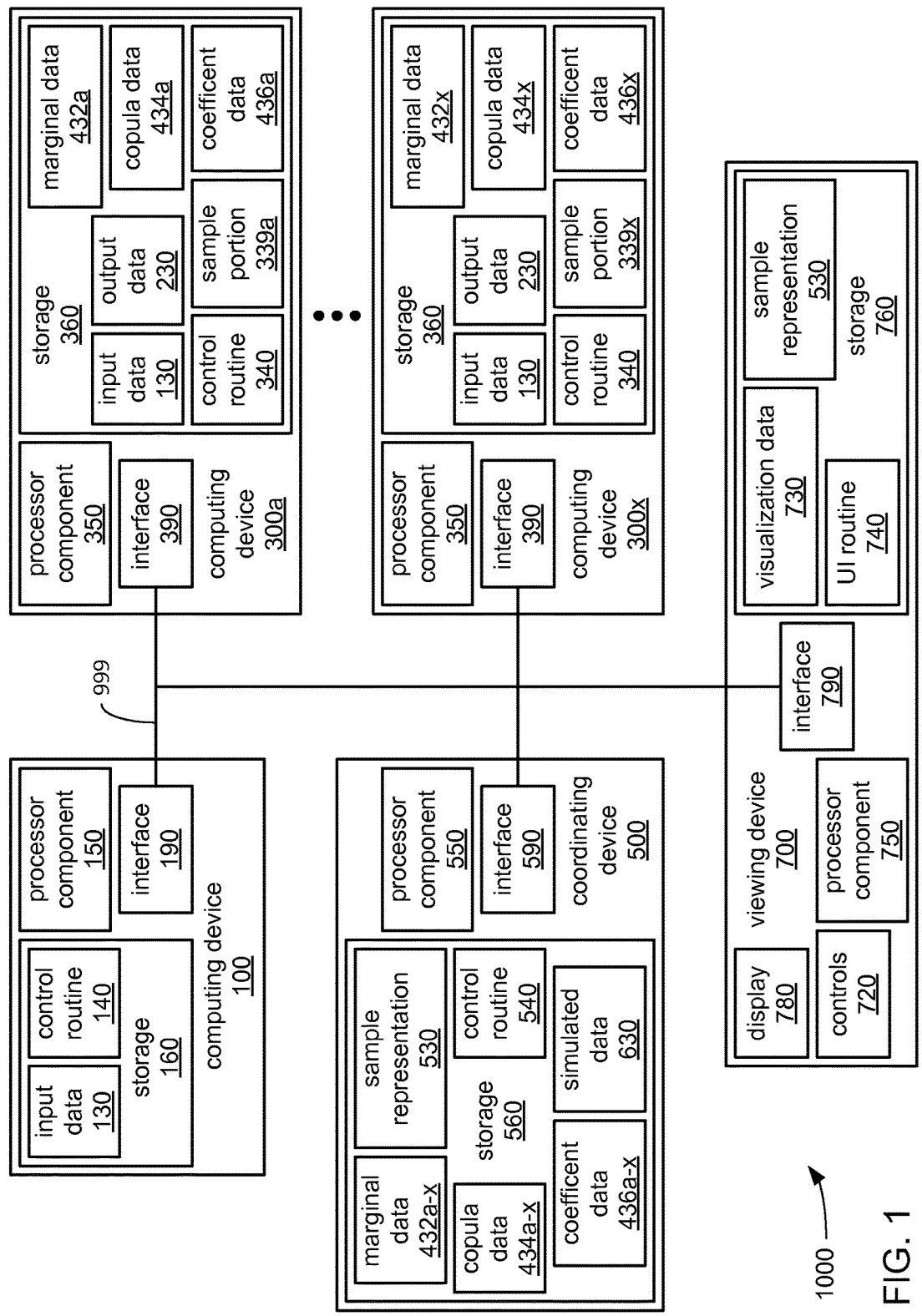
FIG. 1 illustrates an example of an embodiment of an analysis system.

Various embodiments are generally directed to techniques for deriving a reduced-sized sample representation from a relatively large multivariate random sample, such as a simulated random sample generated from a posterior probability distribution derived by Bayesian analysis. Several techniques are combined to efficiently process a large random sample to reduce the information contained in the random sample to a mathematical approximation of its multivariate probability distribution that is able to be represented in a reduced size for storage, transmission and/or use as an input to further analysis.

Many kinds of modern analyses of scientific problems or business and industrial processes produce results in the form of a multivariate probability distribution (MPD). A MPD is a probability representation of the relationships between two or more variables. In many cases, the analytical form of the MPD is intractable and many techniques have been devised to provide an approximate representation of the MPD through simulation methods. These simulation methods typically generate a multivariate random sample which tends to be very large. Such a random sample may be conceptualized as logically forming a table, in which the rows (sometime referred to as "draws") represent the individual sampled cases and the columns represent variables whose values indicate attributes of the samples cases. For such a multivariate random sample the probabilistic dependencies among the variables are often of great interest.

Such a randomly generated sample may be generated in many different ways, including, for example, actual random sampling conducted as part of a scientific study or industrial quality control process or by the monitoring of various sensors as in industrial process control or environmental monitoring applications. Alternatively, a random sample may be simulated random sample that is randomly generated by a computer simulation of a mathematical model as part of a statistical analysis. One type of statistical analysis of increasing importance that may lead to the random generation of a simulated random sample is Bayesian statistical analysis. In Bayesian statistical analysis, a data set is analyzed through a statistical model for which a prior probability distribution needs to be provided. In particular, the prior probability distribution provides information about the parameters of the model chosen to analyze the data. From these inputs, a new probability distribution for the parameters, called the posterior probability distribution, is produced. The interest is in this posterior probability distribution, from which inferences can be made regarding the parameter variables. In general, this posterior probability distribution cannot be analyzed directly, but a simulated random sample may be randomly generated from it. Unfortunately, especially for multivariate posterior probability distributions, a simulated random sample may be quite large in size and/or in the number of its variables. The problem of working with a simulated random sample generated from a posterior probability distribution derived from a Bayesian statistical analysis is used as an illustration in the following. However, it should be noted that the techniques disclosed herein may be employed with a wide variety of large random samples, whether simulated or generated from collection of real world data.

In generating a reduced-size sample representation of a large random sample, descriptive statistics for the random sample are derived, univariate marginal probability distributions are separately fitted for each of the variables of the random sample, and the random sample is transformed using the marginal probability distributions and fitted to a copula model of the probabilistic dependencies among the variables. The marginal probability distributions and copula model, together, provide a relatively compact sample representation of the random sample that may be stored, transmitted or used as an input to further analysis.

When used for such further analysis, the marginal probability distributions and copula model, together, are able to provide information about aspects of the multivariate distribution and joint probability of the random sample. Alternatively or additionally, the marginal probability distributions and copula model may be used to generate a new and more compact simulated random sample having statistical properties similar to the original and larger random sample from which the marginal probability distributions and copula model were derived, as described above. Such a more compact simulated random sample may be used as a prior probability distribution in the implementation of a Bayesian analysis of new observed data.

In some embodiments, the random sample data may be randomly generated in portions distributed across multiple computing devices. In such embodiments, analysis may be performed on those portions of the random sample in place within each of those computing devices in which those portions were generated, thereby obviating the need to transmit one or more of those portions of the random sample between computing devices. This desirably avoids the use of valuable bandwidth in communications links between computing devices (e.g., a network therebetween) to exchange what may be quite large portions of the random sample.

As familiar to those skilled in the art, in any multivariate random sample, a univariate marginal sample for any one of the variables can be obtained simply by ignoring the data for the other variables. By sorting the marginal random sample for a variable (that is, sorting the column of the logical data table for that variable), an estimate of the marginal probability distribution of that variable, called the empirical distribution function, can be obtained. If the multivariate random sample is reasonably small (e.g., includes a relatively small number of draws), then the empirical distribution functions may be used as approximations for the marginal distributions of the variables.

However, if the multivariate random sample is large (e.g., includes a relatively large number of draws), then the empirical distribution functions of the variables may be reduced by taking selected quantiles from the empirical distribution functions. For example, if there are 10,000,000 values in the random sample, then the marginal distribution can be well-approximated by selecting every 10,000th value from the sorted sample. Alternatively, if the sample size (number of values) and the number of quantiles retained are not divisible, various statistical techniques may be employed to estimate the quantiles from the empirical distribution function. If less accuracy and more data reduction is desired, a smaller number of quantile values can be retained to form an approximation of the marginal probability distribution for each variable.

As familiar to those skilled in the art, given a univariate empirical distribution function or a set of quantiles from a univariate distribution function, a mathematical function approximating the marginal distribution function for each variable can be fitted using various methods of numerical analysis and approximation theory in such a way that statistical properties pertaining to probability distribution functions are satisfied by the fitted approximating function in some embodiments. In other embodiments, selected quantiles of empirical distribution functions may be used to represent marginal probability distributions for each variable without further data reduction. A choice between use of an approximating function or quantiles may be made based on a determination of a degree of accuracy desired.

As familiar to those skilled in the art, given a random variable and its empirical distribution function of a random sample of values of the variable, or a set of quantiles from the empirical distribution function, or an appropriate approximating function thereto, it is possible to calculate, for any possible value of the variable an approximate probability that the random variable would take a value less than or equal to that possible value. Conversely, it is possible to calculate for any possible probability value the approximate corresponding value of the random variable demarcating the set of smaller or equal values having that possible probability. The former calculation, considered over all possible values of the variable, is called the cumulative distribution function (CDF) of the random variable. The latter calculation, considered over all possible probability values, is called the inverse cumulative probability distribution function (ICDF). Thus, the representations of the marginal distributions described above are sufficient to compute approximations for the CDF and ICDF functions for each of the variables of the random sample.

In embodiments in which portions of the random sample are distributed among multiple computing devices, the derivation of marginal probability distribution approximations of the variables may be performed in parallel. More precisely, derivation of partial marginal probability distributions of the variables for each portion of the random sample may each be independently performed by each of the multiple computing devices in which one of the portions of the random sample is stored. These partial marginal probability distribution approximations of this derivation for each variable for each portion may then be gathered at a single coordinating device, sorted and combined to produce final approximations of marginal probability distributions for each variable.

In some embodiments, the partial marginal distribution approximations may be communicated among computing devices as quantiles derived from the variables of the various random sample portions. As familiar to those skilled in the art, quantile estimates from portions of a sample can be combined to form estimated quantiles reflecting the information of a whole sample using appropriate statistical estimation techniques. In other embodiments, partial marginal distribution approximations may be communicated among computing devices as fitted approximating functions. As familiar to those skilled in the art, multiple approximating functions that are of the same mathematical form and are approximations of the same function may be joined in a linear combination to form a single more accurate approximating function of the same form. The coefficients of this single approximating function may be averages of the coefficients of the combined approximating functions. Those averages may be weighted averages to accommodate differences in size among the random sample portions.

As familiar to those skilled in the art, any multivariate probability distribution can be approximated in terms of its marginal probability distributions and a copula function, where the copula function is a multivariable function of the random variables in which each variable is transformed by its marginal cumulative distribution function, such that the direct arguments to the copula are separately uniformly distributed. As familiar to those skilled in the art, a variety of forms of copula function are available for approximating multivariate probability distributions, in which each of the copula forms include coefficients that may be adjusted to fit the copula function to a given multivariate random sample more closely. Such fitting of copula coefficients may be accomplished through statistical techniques such as maximum likelihood estimation. Data representing fitted coefficients of such a fitted copula function are typically of much smaller size than data representing the original random sample, thereby enabling the copula function to serve as part of a relatively compact representation of the random sample.

In embodiments in which the random sample is distributed in portions among multiple computing devices, portions of the fitting of a copula function may be performed in parallel employing the random sample portions stored within each of the multiple computing devices, and without exchanging any of the random sample portions among those computing devices. For example, when a maximum likelihood process of fitting a copula is used, only the likelihood contribution of each random sample portion, its gradient and an information criteria matrix (e.g., first and second derivative) with respect to coefficients of the copula need be communicated. The fitting of a copula function may be performed in an iterative manner in which likelihood contributions and gradients for each portion of the random sample are exchanged between the multiple computing devices and a coordinating device, along with adjusted coefficients of the copula function, for each iteration. The iterations of fitting continue until the coefficients resulting from a particular iteration indicate a fit meet predefined stopping criteria for the copula function to be deemed to be fitted. Further, this fitting of a copula function may performed for multiple copula functions, where each copula function is of a different copula form. After all of the multiple copula functions are fitted, at least the one of those multiple copula functions that was fitted to the best degree is selected for use.

As an illustration, if there are 10,000,000 samples on 100 variables distributed equally over 10 computing devices, then each device will have data representing 1,000,000 times 100 values, or 100,000,000 numerical values in total. The number of coefficients of a copula function to be fit will usually depend on the number of variables, and may be more or less than the number of variables depending on the copula form used. If the copula form used contains 50 free coefficients to be fit, then the likelihood contribution and the gradient of the likelihood contribution that must be transmitted among computing devices in the likelihood maximization process will be only 51 values per device per iteration of the maximization algorithm. The number of coefficients in a typical copula function is no greater than approximately one half of the square of the number variables. For example, using a general multivariate 't' copula would typically, in this example, entail communication of 4,951 values per computing device per iteration, which is still orders of magnitude less than the 100,000,000 values of each of the random sample portions.

In some embodiments, indications of the marginal distribution approximations and the copula function described above may be combined into a single data structure that represents the approximate multivariate distribution of the random sample. The form of the data structure of this sample representation may be selected to enable further analysis, storage and/or transmission between computing devices. In some embodiments, this data structure may also include information regarding the nature and origin of the random sample from which the marginal distributions and copula function were derived (e.g., the date and/or time of that derivation, whether generated from real word data or simulated, etc.), and/or other information. In some embodiments, the data structure may contain descriptive statistics regarding the variables in the random sample and their statistical associations, such as covariances and correlations.

As familiar to those skilled in the art, a representation of a multivariate probability distribution as described above may be used to compute approximate values of the multivariate cumulative distribution function (CDF) for any possible combination of values of the variables, and can be used to compute an approximation to the multivariate probability density function (PDF) of the distribution, as well as computing the approximate CDF and PDF functions for the marginal distributions of the variables considered separately. In some embodiments, the sample representation described above may be employed to provide approximate multivariate and marginal CDF and PDF values of the distribution represented by the random sample in the context of other processes and later analysis for which such information may be of value.

As familiar to those skilled in the art, a copula function and the inverse marginal CDF functions for the variables may be combined with random number generators to produce simulated random samples from the represented multivariate probability distribution. In some embodiments, the sample representation of the multivariate distribution encoded in the data structure described above may be used to create new random samples having statistical properties similar to the original random sample by randomly resampling from the given random sample data from which the representation was created.

Thus, the copula function and marginal probability distributions for each of the variables may be used in all circumstances where the statistical information contained in the random sample is needed as an approximate substitute for that random sample data. A data structure including the copula function and marginal probability distributions provides a more compact representation of the original random sample and may be used as a substitute for the random sample where the random sample is not available and/or the relatively large size of the random sample makes such use of the random sample prohibitively difficult.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Figure 2:
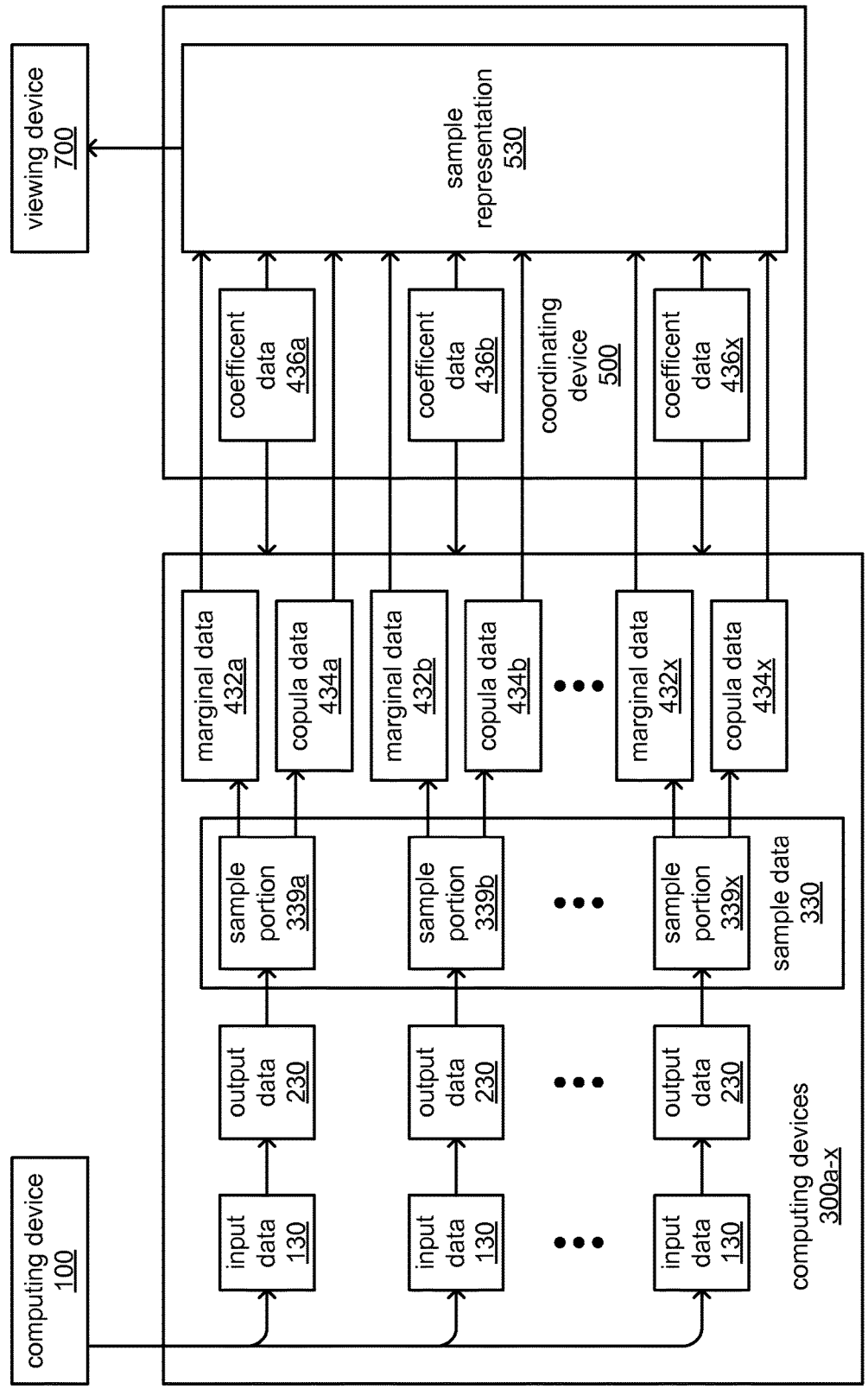
FIG. 2 illustrates an example of a distribution of data in an analysis system.

FIG. 1 illustrates a block diagram of an embodiment of an analysis system 1000 incorporating one or more of a computing device 100, multiple computing devices 300a-x, a coordinating device 500 and/or a viewing device 700. FIG. 2 illustrates an embodiment of operation of the analysis system 1000. Each of these computing devices may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc. Embodiments are not limited in this context.

As depicted, these computing devices 100, 300a-x, 500 and/or 700 exchange communications conveying data associated with generating a relatively large multivariate random sample and/or generating a reduced-sized sample representation thereof through a network 999. However, one or more of the computing devices 100, 300a-x, 500 and/or 700 may exchange other data entirely unrelated to the generation or representation of a random sample with each other and/or with still other computing devices (not shown) via the network 999. In various embodiments, the network 999 may be a single network that may extend within a single building or other relatively limited area, a combination of connected networks that may extend a considerable distance, and/or may include the Internet. Thus, the network 999 may be based on any of a variety (or combination) of communications technologies by which communications may be effected, including without limitation, wired technologies employing electrically and/or optically conductive cabling, and wireless technologies employing infrared, radio frequency or other forms of wireless transmission.

It should be noted that although two computing devices 300*a* and 300*x* are specifically depicted in FIG. 1, this depiction is intended to denote a plurality of computing devices of any quantity designated "300*a*" through "300*x*." In some embodiments, at least the computing devices 300*a*-*x* may, together, form an array or "grid" of computing devices able to be operated together in a coordinated manner to perform portions of a search, calculation, etc. in parallel. The computing devices 300*a*-*x* may exchange communications through the network 999 to effect such coordination. One or more of the computing devices 300*a*-*x* serve a coordinating function by distributing input data to the others and/or receiving output data from the others. Alternatively or additionally, one or more other computing devices (e.g., the computing device 100 and/or the coordinating device 500) may perform at least part of such a coordinating function.

More specifically, the computing devices 300*a*-*x* may cooperate to perform aspects of generating a reduced-sized sample representation of a random sample represented in its original form by sample data 330. As has been discussed, in some embodiments, the random sample may be generated through collection of real-world data. However, in other embodiments, the random sample may be a simulated random sample generated from a simulation based on a posterior probability distribution derived through the implementation of a statistical analysis, such as a Bayesian analysis.

The computing devices 300*a*-*x* may each perform an instance of the same Bayesian analysis in parallel of the same prior probability distribution and other information to enable each to derive the same posterior probability distribution. In support of performing the Bayesian analysis in such a manner, the computing device 100 may distribute input data 130 representing a data set, a mathematical model providing a predicted probability of observing various values associated with the data set, and a prior probability distribution to each of the computing devices 300*a*-*x*. The Bayesian input data 130 may be any of a variety of types of data, including and not limited to, economic indicators, financial transactions, securities market prices, sales figures, production figures, census data, weather data, election results, etc. The computing device 100 may exchange further communications with each of the computing devices 300*a*-*x* to trigger and/or coordinate their parallel performances of the same Bayesian analysis. In performing multiple instances of the same Bayesian analysis in parallel, each of the computing devices 300*a*-*x* independently derives the same output data 230 representing a posterior probability distribution from the input data 130.

The generation of a simulated form of the random sample may be distributed among the computing devices 300*a*-*x*. More precisely, the computing devices 300*a*-*x* may, in parallel, randomly generate corresponding sample portions 339*a*-*x* of the sample data 330 representing the random sample from the output data 230. The fact of each of the computing devices generating a portion of the random sample in a manner in which values are generated randomly for each portion may be relied upon to cause each of the portions of the random sample generated by each of the multiple computing devices to be different, rather than identical to each other. The generation of sample portions 339*a*-*x* representing portions of a simulated form of the random sample represented by the sample data 330 are able to be performed without the exchange of any of the sample portions 339*a*-*x* among the computing devices 300*a*-*x*.

Regardless of whether the random sample represented by the sample data 330 is generated from the collection of real-world data or is a simulated form of random data generated by the computing devices 300*a*-*x* as just described, the computing devices 300*a*-*x* and coordinating device 500 cooperate to generate a sample representation 530 representing the random sample in a more compact form. In parallel, the computing devices 300*a*-*x* may independently fit approximations of marginal probability distributions of each variable of the random sample. In some embodiments, if the random sample is relatively small, such that each of the sample portions 339*a*-*x* are relatively small (e.g., each of the sample portions 339*a*-*x* include relatively few draws), then empirical distribution functions representing fitted estimates of the marginal probability distributions of each of the variables may be directly employed as partial marginal probability distribution approximations of the variables of the portions of the random sample represented by the sample portions 339*a*-*x*. However, if the random sample is relatively large, then quantiles may be derived of those empirical distribution functions, and the quantiles may be employed as the partial marginal probability distribution approximations. Regardless of the manner in which these partial marginal probability distribution approximations are derived, the computing devices 300*a*-*x* may transmit them as marginal data 432*a*-*x*, respectively, to the coordinating device 500, where they are combined to form a single marginal probability distribution approximation for each of the variables for the entirety of the random sample.

Also in parallel, the computing devices 300*a*-*x* may independently fit portions of copula functions of one or more copula forms to portions of the random sample represented by corresponding ones of the sample portions 339*a*-*x*. The fitting of each copula function (one for each copula form) may be an iterative process in which each of the computing devices 300*a*-*x* may exchange communications with the coordinating device 500 concerning aspects of fitting during each iteration to enable the coordinating device 500 to analyze the copula coefficients resulting from each fit to determine when to stop the iterative fitting of each of the copula functions. More specifically, with each iteration, each of the computing devices 300*a*-*x* may transmit copula data 434*a*-*x*, respectively, that includes indications of likelihood functions and gradients of the portions of the random sample with respect to the copula coefficients employed in the current iteration. Also, the coordinating device 500 may transmit coefficient data 436*a*-*x* to corresponding ones of the computing devices 300*a*-*x* to be used in another iteration. Following the fitting of one copula function for each of the one or more copula forms, the coordinating device 500 selects whichever one of the copula functions was fitted with to the multivariate probability distribution of the random sample to the best degree.

After forming marginal probability distribution approximations for each variable, and after both fitting and selecting the best fitting copula function, the coordinating device 500 may combine indications of those marginal probability distribution approximations and that selected copula function to form the sample representation 530. The sample representation 530 thereby becomes a reduced-size representation of the random sample represented in its original form by the sample portions 339a-x of the sample data 330. As has been discussed, the marginal probability distribution approximations and/or the copula function making up the sample representation 530 may then be used in further analysis of the random sample (e.g., as a prior probability distribution for another Bayesian analysis), in generating (with a random number generator) a more compact simulated random sample having similar statistical properties to the original random sample, and/or in generating a visualization associated with the random sample. To enable one or more of such uses, the coordinating device 500 may transmit the sample representation 530 to one or more of the computing device 100 and the viewing device 700.

In various embodiments, the computing device 100 incorporates one or more of a processor component 150, a storage 160 and an interface 190 to couple the computing device 100 to the network 999. The storage 160 may store the input data 130 and a control routine 140. The control routine 140 incorporates a sequence of instructions operative on the processor component 150 to implement logic to perform various functions. In executing the control routine 140, the processor component 150 exchanges communications with the computing devices 300a-x via the network 999 to at least prepare for a performance of a Bayesian analysis.

Figure 3:
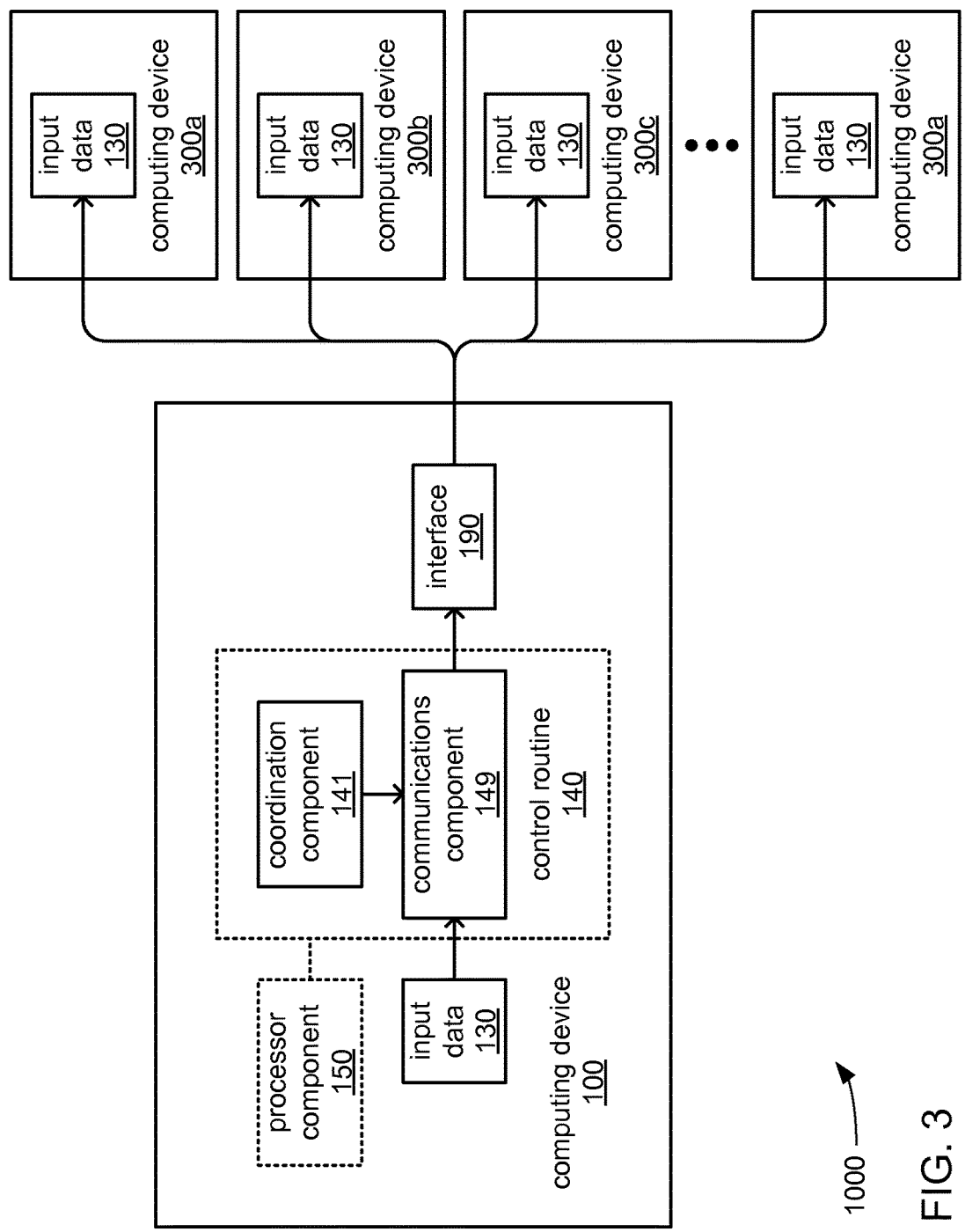
FIGS. 3-5 each illustrate an example of a portion of an embodiment of an analysis system.

FIG. 3 depicts an embodiment of such communications among the computing devices 100 and 300a-x in greater detail. As depicted, the control routine 140 may incorporate one or more of a coordination component 141 and a communications component 149. In executing the control routine 140, the processor component 150 may execute the coordination component 141 and/or the communications component 149.

In preparation for the performance of multiple instances of a Bayesian analysis by the computing devices 300a-x, the communications component 149 operates the interface 190 to transmit the input data 130 to each of the computing devices 300a-x. Following distribution of the input data 130, the coordination component 141 may operate the interface 190 to provide a trigger to one or more of the computing devices 300a-x to begin performance their performances of the Bayesian analysis via the network 999.

Returning to FIG. 1, in various embodiments, each of the computing devices 300a-x incorporates one or more of a processor component 350, a storage 360 and an interface 390 to couple each of the computing devices 300a-x to the network 999. The storage 360 may store one or more of the input data 130, the output data 230, one of the sample portions 339a-x, one of the marginal data 432a-x, one of the copula data 434a-x, one of the coefficient data 436a-x and a control routine 340. The control routine 340 incorporates a sequence of instructions operative on the processor component 350 to implement logic to perform various functions. In executing the control routine 340, the processor component 350 of each of the computing devices 300a-x may perform the same Bayesian analysis to each separately derive the output data 230 from the input data 130 in parallel. The processor component 350 of each of the computing devices 300a-x may then generate a portion of the sample set data 330 (e.g., a corresponding one of the sample set portions 339a-x) from the output data 230. In further executing the control routine 340, the processor component 350 of each of the computing devices 300a-x analyzes its corresponding portion of the random sample represented by one of the sample portions 339a-x to derive partial marginal probability distribution approximations and portions of one or more copula functions of different copula forms therefrom.

Figure 4:
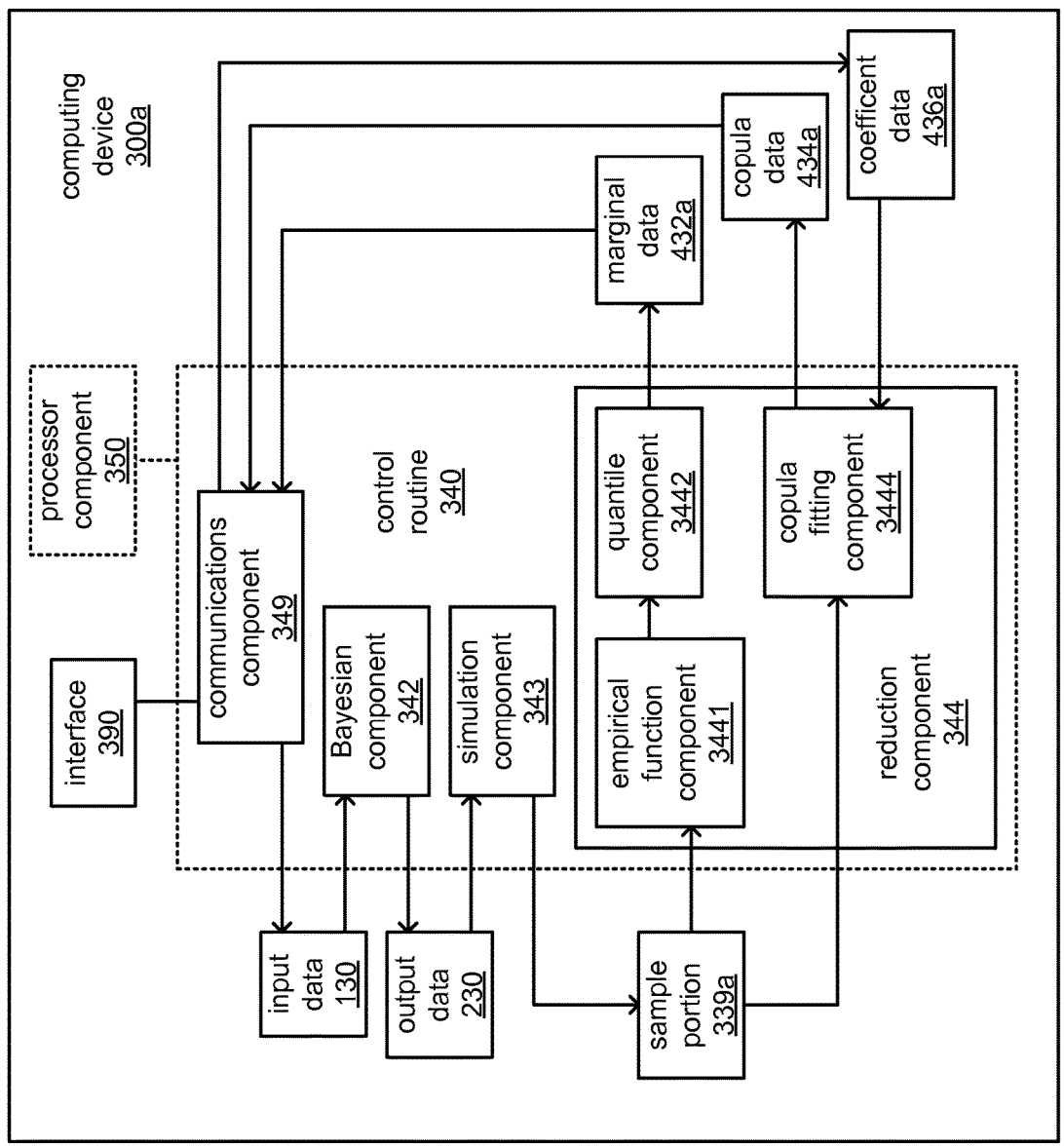

FIG. 4 depicts an embodiment of such performance of an instance of a Bayesian analysis and such further analysis by the computing device 300a in greater detail. Such details associated with the operation of the computing device 300a are depicted as an example of such operation of all of the computing devices 300a-x. As depicted, the control routine 340 may incorporate one or more of a Bayesian component 342, a simulation component 343, a reduction component 344 and a communications component 349. Further, the reduction component 344 may incorporate one or more of an empirical function component 3441, a quantile component 3442 and a copula fitting component 3444. In executing the control routine 340, the processor component 350 may execute one or more of the components 3441, 3442 and 3444 of the reduction component 344, as well as one or more of the Bayesian component 342, the simulation component 343 and the communications component 349.

In preparation for the computing device 300a performing the Bayesian analysis, the communications component 349 operates the interface 390 to receive the input data 130 via the network 999. The communications component 349 may also receive from the computing device 100 and/or one or more of the others of computing devices 300a-x a command or other communication serving as a trigger to begin such performance. The Bayesian component 342 employs at least a prior probability distribution represented by the input data 130 in performing a Bayesian analysis in which the output data 230 is generated.

Following performance of the Bayesian analysis, the simulation component 343 employs the output data 230 to generate the sample portion 339a representing a portion of the random sample. Regardless of whether the random sample represented in portions by the sample portions 339a-x is generated from the collection of real-world data or is a simulated random sample, the random sample may be relatively large in size and/or may include numerous variables.

The empirical function component 3441 fits empirical distribution functions to the marginal probability distributions of each of the variables of at least the portion of the random sample represented by the sample portion 339a. The quantile component 3442 may analyze at least the sample portion 339a and based on the number of samples in 339a, it may reduce its dimension by subsetting the empirical function 3441. In making that determination, the quantile component 3442 may cooperate with the communications component 349 to exchange indications of how many draws are included in the random sample among the computing devices 300a-x. If the number of draws is relatively small, then the empirical distribution functions fitted by the empirical function component 3441 for at least some of the variables may be directly employed as partial marginal probability distribution approximations for those variables and stored as the marginal data 432a. However, if the number of draws is relatively large, then the quantile component 3442 may derive quantiles of each of those empirical distribution functions to be employed as the partial marginal probability distribution approximations for those variables, and may store the quantiles as the marginal data 432a. Regardless of whether the marginal data 432a includes values representing empirical distribution functions or quantiles thereof, those values within the marginal data 432a may be accompanied by indices or another indication of relative ordering of those values (e.g., a mapping of the values to their relative locations in an ordering of the draws of the portion of the random sample stored as the sample portion 339a). The communications component 349 may transmit the marginal data 432a to the coordinating device 500 to be combined with others of the marginal data 432a-x to form marginal probability distributions for all of the variables of the random sample.

The copula fitting component 3444 cooperates with its counterparts of the others of the computing devices 300a-x and with the coordinating device 500 to fit one copula function for each of one or more copula forms to the multivariate distribution of the random sample. The fitting of different portions of a copula function for each portion of the random sample represented by one of the sample portions 339a-x may be performed in parallel by corresponding ones of the copula fitting component 3444 of all of the computing devices 300a-x. The fitting of each copula function may be performed as an iterative process in which all of the computing devices 300a-x attempt to fit their respective portions of a copula function during each iteration to the multivariate distribution of their respective portions of the random sample. During each iteration, all of the computing devices 300a-x transmit representations of their respective fitted portions of a copula function to the coordinating device 500, which aggregates these representations of fitted portions of the copula function to form a complete fitted copula function and evaluates the coefficients thereof to determine whether the degree of fit achieved meets criterion to stop the iterative process for fitting that copula function. If the criterion are met, then no further iterations of fitting are performed for that copula function. Instead, fitting may begin for another copula function associated with a different copula form. However, if the criterion are not met, then the coordinating device 500 may provide new copula coefficients to each of the computing devices 300a-x to use in another iteration in which another attempt is made by each of the computing devices 300a-x to fit the copula function.

Turning more specifically to the copula fitting component 3444 of the computing device 300a, the copula fitting component 3444 fits a portion of a copula function to the multivariate distribution of the portion of the random sample represented by the sample portion 339a. From this attempted fitting, the copula fitting component 3444 stores indications of a likelihood function and of a gradient of the portion of the random sample represented by the sample portion 339a with respect to the coefficients of the copula function as the copula data 434a, and the communications component transmits the copula data 434a to the coordinating device 500. The coordinating device 500 aggregates the indications of a likelihood function and gradient of the copula data 434a with corresponding indications from the others of the copula data 434a-x to generate a representation of the entire copula function as fitted by the computing devices 300a-x. If the degree of fit is determined to not meet the criterion for stopping further iterations to fit the copula function, then the coordinating device 500 may transmit indications of new coefficients as the coefficient data 436a-x to corresponding ones of each of the computing devices 300a-x to use in another attempt to fit the same copula function in a new iteration. However, if the degree of fit is determined to meet the criterion for stopping further iterations to fit the copula function, then the coordinating device 500 simply ceases to provide further coefficients to the computing device 300a-x for further attempts to fit that copula function. However, the coordinating device 500 may proceed to transmit indications of new coefficients (as the coefficient data 436a-x) for use in an iteration to begin the iterative fitting another copula function associated with a different copula form.

The reduction component 344 may cooperate with the communications component 349 to augment the transmission of the marginal data 432a and the iterative transmitting of the copula data 434a to the coordinating device 500 with a transmission of various pieces of information concerning at least the portion of the random sample represented by the sample portion 339a to the coordinating device 500. Such information may include details of the generation of the random sample (e.g., whether generated from real-world data or simulated), size of the sample portion 339a, etc.

The transmissions of the marginal data 432a and the copula data 434a convey enough information to the coordinating device 500 concerning the portion of the random sample represented by the sample portion 339a that the need to transmit that portion of the random sample to the coordinating device 500 is obviated. This enables the sample portions 339a-x to each remain stored within corresponding ones of the computing devices 300a-x, and the need to incur the added time and network resources required to exchange any of the sample portions 339a-x among computing devices is avoided.

Returning to FIG. 1, in various embodiments, the coordinating device 500 incorporates one or more of a processor component 550, a storage 560 and an interface 590 to couple the coordinating device 500 to the network 999. The storage 560 may store the marginal data 432a-x, the copula data 434a-x, the coefficient data 436a-x, the sample representation 530, simulated data 630 and a control routine 540. The control routine 540 incorporates a sequence of instructions operative on the processor component 550 to implement logic to perform various functions. In executing the control routine 540, the processor component 550 combines the partial marginal probability distribution approximations received in the marginal data 432a-x received from the computing devices 300a-x to form part of the sample representation 530. The processor component 550 also cooperates with the computing devices 300a-x to iteratively fit one or more copula functions (each of a different copula form) to the multivariate distribution of the random sample, and selects one of the fitted copula functions to form another part of the sample representation 530. The processor component 550 may then employ the marginal probability distribution approximations and/or the copula function making up the sample representation 530 (along with a random number generator) in generating a reduced-sized simulated random sample represented by the simulated data 630.

Figure 5:
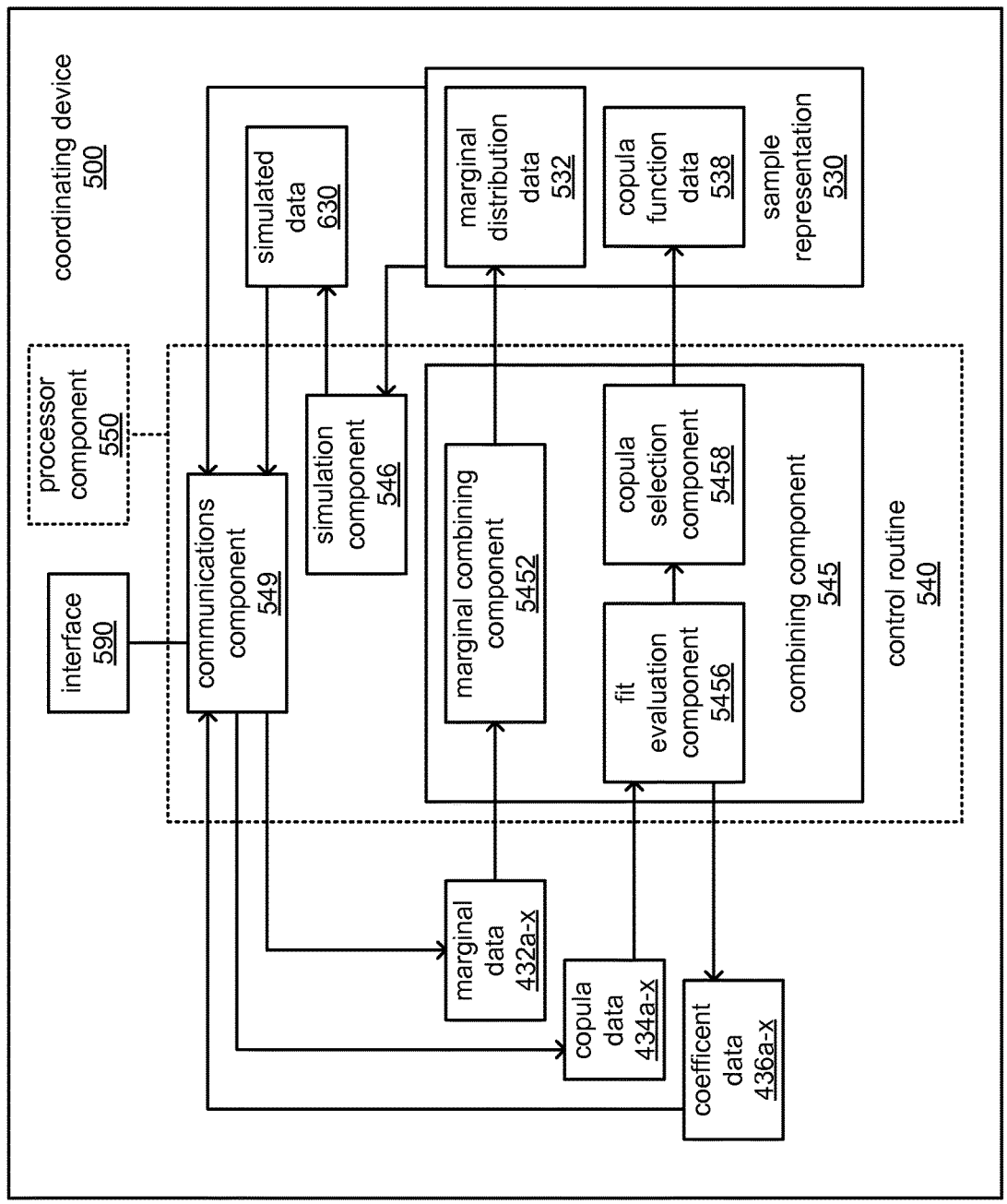

FIG. 5 depicts an embodiment of such combining and cooperating in iterative fitting to generate a reduced-sized representation of the random sample and of such generation of a reduced-sized simulated random sample therefrom. As depicted, the control routine 540 may incorporate one or more of a combining component 545, a simulation component 546 and a communications component 549. Further, the combining component 545 may incorporate one or more of a marginal combining component 5452, a fit evaluation component 5456 and a copula selection component 5458. In executing the control routine 540, the processor component 550 may execute one or more of the components 5452, 5456 and 5458 of the combining component 545, as well as the simulation component 546 and/or the communications component 549.

The communications component 549 may operate the interface 590 to receive the marginal data 432a-x and the copula data 434a-x from the computing devices 300a-x, respectively. The communications component 549 may also operate the interface 590 to transmit the coefficient data 436a-x to the computing devices 300a-x, respectively.

The marginal combining component 5452 may sort and then combine the values received from each of the computing devices 300a-x in the marginal data 432a-x, respectively, to form marginal probability distribution approximations for each of the variables of the random sample. As previously discussed, the values making up each of the partial marginal probability distribution approximations so received from the computing devices 300a-x may represent empirical distribution functions fitted for each of the variables or may represent quantiles taken of those empirical distribution functions. As also previously discussed, each of the partial marginal probability distribution approximations may be accompanied by indices or another indication of the relative ordering of those values. The marginal combining component 5452 may employ such indices or other indications of relative ordering in any of a variety of sorting algorithms known to those skilled in the art to order the values of all of the partial marginal probability distribution approximations for each variable as part of deriving marginal probability distribution approximations for each variable. The marginal combining component 5452 may then store indications of those marginal probability distribution approximations as marginal distribution data 532 making up part of the sample representation 530.

The fit evaluation component 5456 may aggregate the indications of likelihood functions and gradients of the different portions of the random sample with respect to copula coefficients to form a complete copula function fitted by the computing devices 300a-x in each iteration of what may be multiple iterations for each copula function, as earlier described. The fit evaluation component 5456 may then evaluate the resulting coefficients of each attempt at fitting a copula function so made by the computing devices 300a-x in each iteration to determine whether the values of the coefficients indicate that criterion for stopping the performance of iterations to fit a particular copula function has yet been met. If the criterion has not been met, then the fit evaluation component 5456 may generate a new set of copula coefficients, storing them as the coefficient data 436a-x to be transmitted by the communications component 549 to the computing devices 300a-x, respectively, to use in attempting again to fit a copula function. However, if the criterion has been met, then the fit evaluation component 5456 may simply cease to generate any more new sets of copula coefficients to be so transmitted to the computing devices 300a-x as part of stopping the performance of further iterations of fitting copula functions. Alternatively, if the criterion has been met for the fitting of a copula function associated with one copula form, but there remains another copula form for which a copula function is to be fitted, then the evaluation component 5456 may generate copula coefficients for one or more iterations of fitting of the copula function for that other copula form, and store them as the coefficient data 436a-x to be transmitted to the computing devices 300a-x, respectively.

Thus, the fit evaluation component 5456 cooperates through the network 999 with the copula fitting component 3444 (see FIG. 4) of each of the computing devices 300a-x to perform multiple iterations of fitting for a copula function for each of one or more copula forms. After the completion of fitting of copula functions for each of the one or more copula forms, the copula selection component 5458 may evaluate the degree of fit achieved for each of the copula functions to the multivariate distribution of the random sample, and select the copula function having the best degree of fit for use in compactly representing the random sample. The copula selection component 5458 may then store indications of the selected copula function as copula function data 538 making up part of the sample representation 530, along with the marginal probability distribution approximations of the marginal distribution data 532 also making up part of the sample representation 530. As has been previously discussed, the marginal probability distribution approximations and/or the copula function making up the sample representation 530 may then be used in further analysis (e.g., as a prior probability distribution for another Bayesian analysis), generating a visualization, etc.

The combining component 545 may augment the sample representation 530 with indications of various pieces of information concerning the random sample now represented in a more compact form by the sample representation 530. Such information may include details of the generation of the random sample (e.g., whether generated from real-world data or simulated), sizes of all of the sample portions 339a-x and/or of the entirety of the random sample, etc.

Following such generation of the sample representation 530, the communications component 549 may operate the interface 590 to transmit the sample representation 530 to another device (e.g., the computing device 100 or the viewing device 700) via the network 999 for use as an input in further analysis and/or in generating a visualization. This may be done in response to a request received from another computing device for the sample representation 530. It should be noted that the sample representation 530 may remain stored within the storage 560 for some time before it is so transmitted and/or used.

The simulation component 546 may retrieve the indications of the copula function and the marginal probability distribution approximations from the sample representation 530, and employ them to generate a reduced-sized simulated random sample represented by the simulated data 630 that has statistical characteristics similar to the original random sample represented by the sample data 330. More precisely, the simulation component 546 may derive inverse marginal CDF functions of each of the marginal probability distribution approximations. The simulation component 546 may then use those inverse marginal CDF functions along with the copula function and at least one random number generator to produce the reduced-sized simulated random sample represented by the simulated data 630. The simulated data 630 may be transmitted by the communications component 549 to the computing device 100 and/or the computing devices 300a-xto enable further analysis in which the simulated data 630 is able to be used in place of the sample data 330. The smaller size of the simulated data 630 (and of the simulated random sample it represents) may enable further analysis with a reduced processing resource requirement than if the sample data 330 were used.

It should be noted that, despite the specific depiction and discussion of the coordinating device 500 performing the combining of partial marginal probability distribution approximations and portions of a copula function, other embodiments are possible in which one or more of the computing devices 300a-x may perform such combining. It should also be noted that, despite the specific depiction and discussion of the computing device 100 distributing the input data 130 among the computing devices 300a-x, other embodiments are possible in which at least one of the computing devices 300a-x does so.

Returning to FIG. 1, in various embodiments, the viewing device 700 incorporates one or more of a processor component 750, a storage 760, a display 780, controls 720 and an interface 790 to couple the viewing device 700 to the network 999. The storage 760 may store one or more of each of the sample representation 530, visualization data 730 and a user interface (UI) routine 740. The UI routine 740 incorporates a sequence of instructions operative on the processor component 750 to implement logic to perform various functions. In executing the control routine 740, the processor component 750 operates the interface 790 to receive the sample representation 530 from the coordinating device 500 via the network 999, generates the visualization data 730 therefrom, and operates the display 780 to present a visualization represented by the visualization data 730. The processor component also operates the controls 720 and the display 780 to provide a UI to enable an operator of the viewing device 700 to control aspects of the generation of such a visualization.

Each of the processor components 150, 350, 550 and 750 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are linked.

In various embodiments, each of the storages 160, 360, 560 and 760 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 190, 390, 590 and 790 may employ any of a wide variety of communications technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1 xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 6:
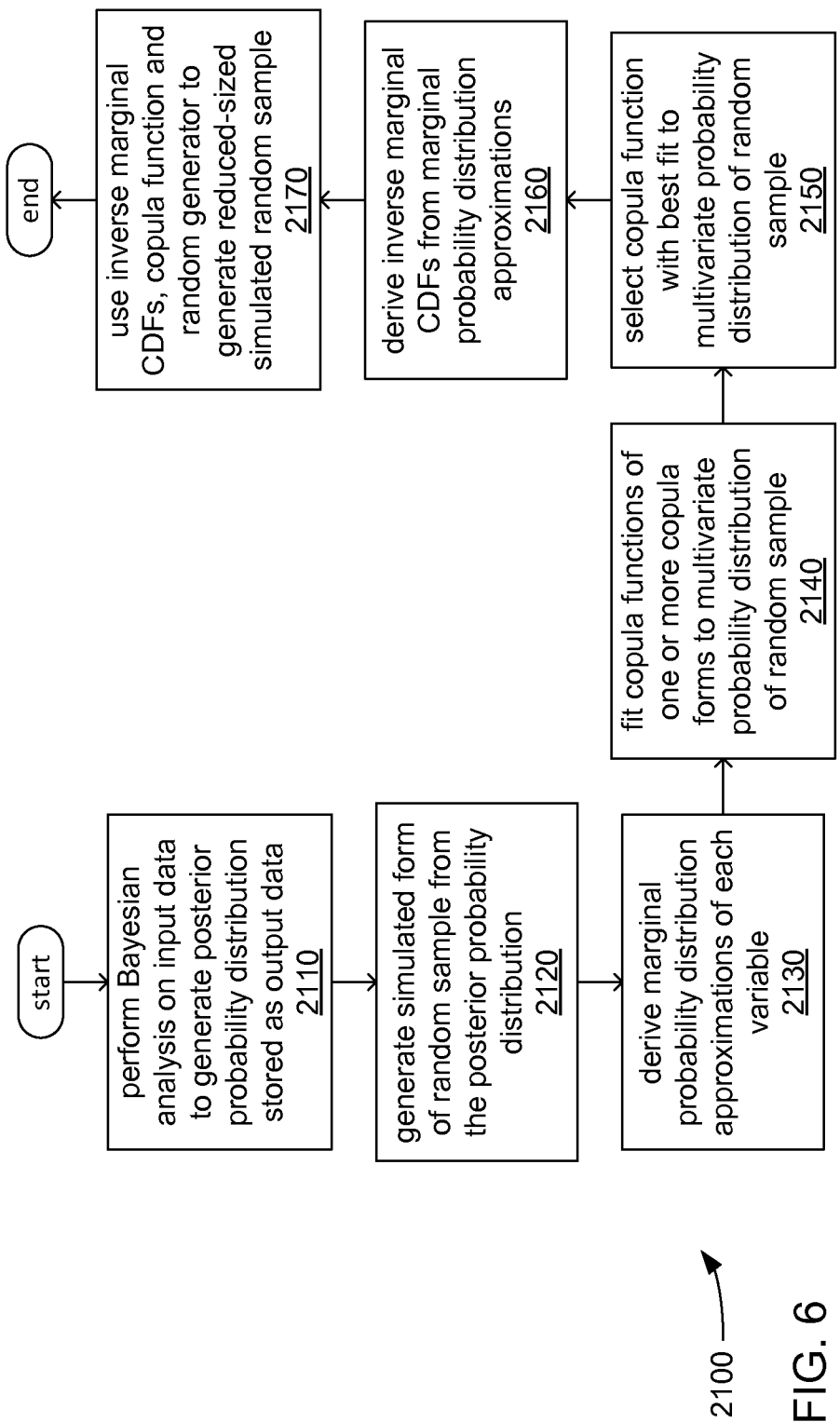
FIG. 6 illustrates an embodiment of a logic flow of generating a sample representation from a simulated random sample generated from a posterior probability distribution.

FIG. 6 illustrates an embodiment of a logic flow 2100 of generating a sample representation from a simulated random sample generated from a posterior probability distribution. The logic flow 2100 may be representative of some or all of the operations executed by one or more embodiments described herein. More specifically, the logic flow 2100 may illustrate operations performed by the processor components 150, 350 and/or 550 in executing the control routines 140, 340 and/or 540, respectively, and/or performed by other component(s) of at least the computing devices 100, 300a-x and/or 500 in generating the sample representation 530.

At 2110, processor components of multiple computing devices (e.g., the processor component 350 of each of the multiple computing devices 300a-x) each independently perform the same Bayesian analysis on the same input data (e.g., the input data 130) that includes one or more of a prior probability distribution, a model and a data set. In so doing, each of the multiple computing devices derives the same output data (e.g., the output data 230) that includes the same posterior probability distribution in parallel. As previously discussed, such performances of instances of the same Bayesian analysis may be performed in parallel by multiple computing devices forming an array or "grid" of computing devices.

At 2120, the processor component of each of the multiple computing devices generates a portion of a simulated form of random sample (e.g., the sample portions 339a-x of the sample data 330) from the output data that each generated during the Bayesian analysis. As previously discussed, the size of such a simulated form of random sample may be quite large and/or may include a relatively large number of variables.

At 2130, the processor component of each of the multiple computing devices derives partial marginal probability distributions for each variable of the portion of the random sample it earlier derived. As previously discussed, this may entail at least fitting empirical distribution functions for each variable, and may additionally entail deriving quantiles of each of those empirical distribution functions. The partial marginal probability distribution approximations may later be combined to form marginal probability distribution approximations associated with the entire random sample.

At 2140, the processor component of each of the multiple computing devices (e.g., the processor component 350 of each of the multiple computing devices 300a-x) fits a portion of one copula function for each of one or more copula forms to the multivariate probability distribution of at least a corresponding portion of the random sample. The portions of each of the copula functions may later be combined to form complete copula functions.

At 2150, at least one processor component of another computing device (e.g., the processor component 550 of the coordinating device 500) selects the one of the copula functions (one each of which is associated with a different copula form) that is best fitted to the multivariate probability distribution of the random sample.

At 2160, the at least one processor component of the other computing device (e.g., the processor component 550 of the coordinating device 500) derives inverse marginal CDFs from the marginal probability distribution approximations. At 2170, the inverse marginal CDFs, the copula function and a random generator are employed to generate a reduced-sized simulated random sample that is smaller in size than the random sample, but has similar statistical characteristics.

Figure 7:
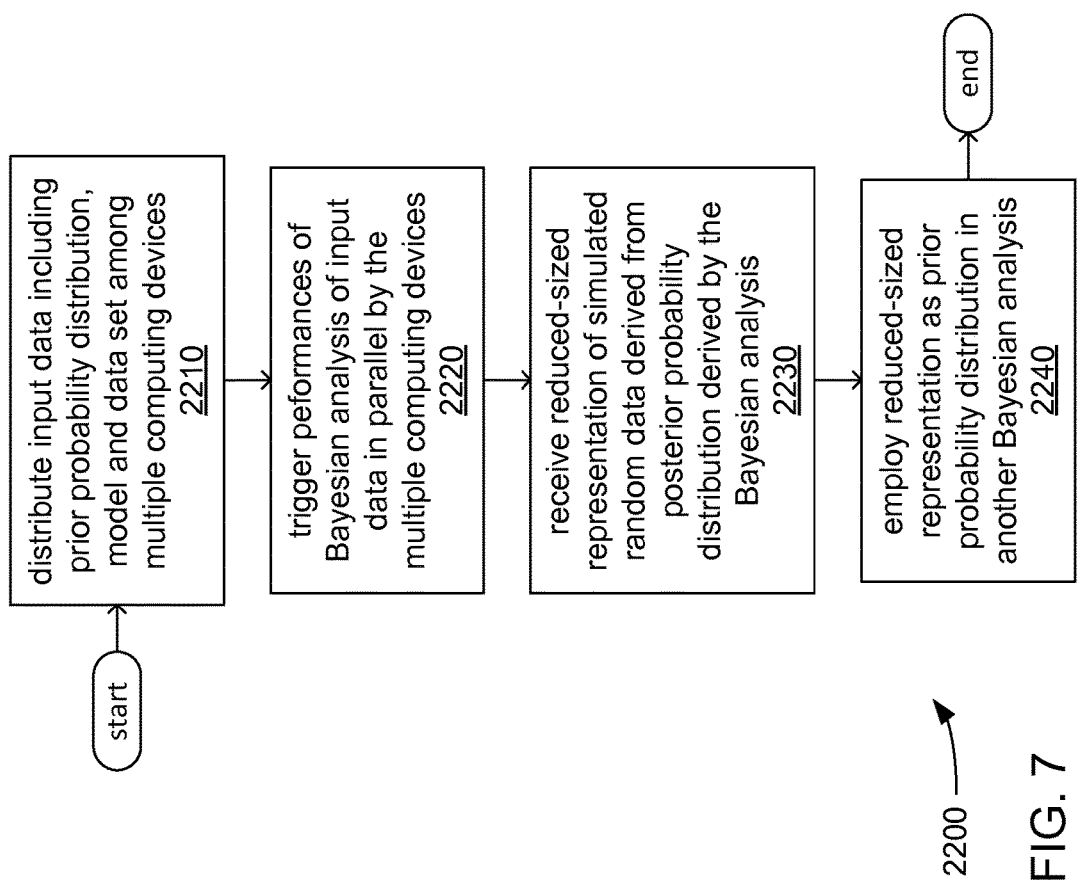
FIG. 7 illustrates an embodiment of a logic flow of supporting a performance of a Bayesian analysis and receiving a sample representation from a random sample generated from a posterior probability distribution derived by the Bayesian analysis.

FIG. 7 illustrates an embodiment of a logic flow 2200. The logic flow 2200 may be representative of some or all of the operations executed by one or more embodiments described herein. More specifically, the logic flow 2200 may illustrate operations performed by the processor component 150 in executing the control routine 140, and/or performed by other component(s) of at least the computing device 100 in triggering performance of a Bayesian analysis to generate the output data 230 from the input data 130.

At 2210, a processor component of a computing device (e.g., the processor component 150 of the computing device 100) distributes input data representing a prior probability distribution, a model and a data set to multiple other computing devices (e.g., the input data 130 to the multiple computing devices 300a-x). At 2220, the computing device exchanges communications with one or more of the other computing devices (e.g., transmits a command to begin performing a Bayesian analysis) to cause the other computing devices to each perform an instance of the same Bayesian analysis in parallel with the others.

At 2230, the computing device receives a reduced-sized representation of a simulated random sample generated from a posterior probability distribution derived from the performance of the Bayesian analysis (e.g., the sample representation 530 derived from the Bayesian simulation data 330). As previously explained, such a reduced-sized sample representation includes marginal probability distribution approximations for each variable and a copula function. At 2240, the reduced-sized representation may be employed as a prior probability distribution in the performing another Bayesian analysis.

Figure 8:
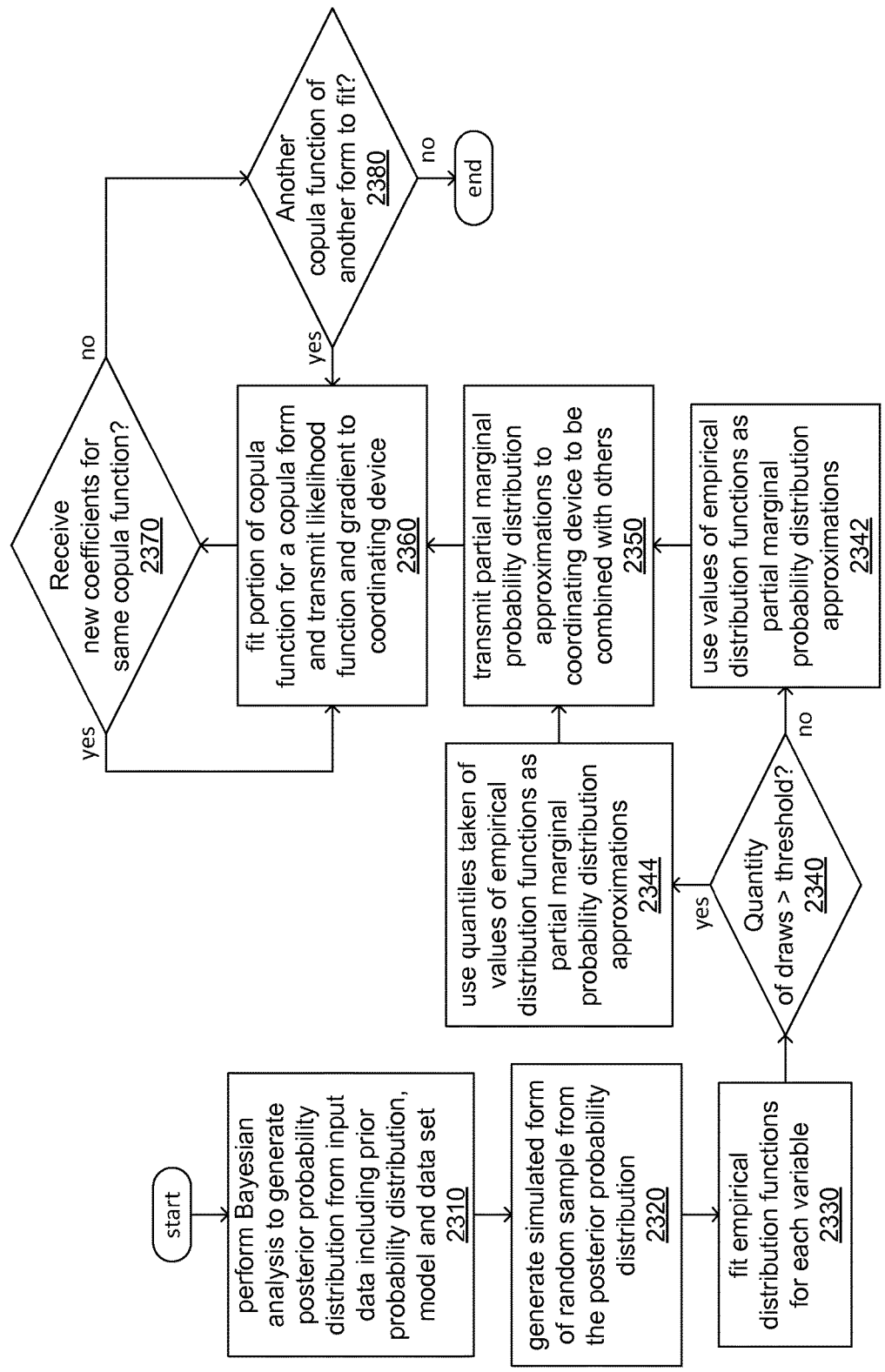
FIG. 8 illustrates an embodiment of a logic flow of generating marginal data and copula data from a random sample.

FIG. 8 illustrates an embodiment of a logic flow 2300. The logic flow 2300 may be representative of some or all of the operations executed by one or more embodiments described herein. More specifically, the logic flow 2300 may illustrate operations performed by the processor component 350 in executing the control routine 340, and/or performed by other component(s) of one or more of the computing devices 300a-x in generating at least the marginal data 432a-x and the copula data 434a-x from the sample portions 339a-x, respectively, of the sample data 330.

At 2310, a processor component of one of multiple computing devices (e.g., the processor component 350 of one of the multiple computing devices 300a-x) performs a Bayesian analysis on input data (e.g., the input data 130) to generate an output data that represents a posterior probability distribution (e.g., the output data 230). As previously discussed, the very same Bayesian analysis on the very same input data may be performed in parallel by multiple computing devices forming an array or "grid" of computing devices.

At 2320, the processor component of each of the multiple computing devices generates a portion of a simulated form of random sample (e.g., the sample portions 339a-x of the sample data 330) from the output data that each generated in performing the Bayesian analysis. As previously discussed, the size of such a simulated form of random sample may be quite large and/or may include a relatively large number of variables.

At 2330, the processor component of each of the multiple computing devices fits empirical distribution functions for each variable. At 2340, a check is made as to whether the quantity of draws of the random sample exceeds a predetermined threshold. If the predetermined threshold is not exceeded, then the values representing the empirical distribution functions are used directly as partial marginal probability distribution approximations at 2342. However, if the predetermined threshold is exceeded, then quantiles of the values representing the empirical distribution functions are taken and are used as the partial marginal probability distribution approximations at 2344. At 2350, the processor component of each of the multiple computing devices transmits the partial marginal probability distribution approximations (e.g., corresponding ones of the marginal data 432a-x) to a coordinating device (e.g., the coordinating device 500).

At 2360, the processor component of each of the multiple computing devices (e.g., the processor component 350 of each of the computing devices 300a-x) fits a portion of a copula function associated with a copula form to the multivariate distribution of at least the portion of the random sample stored within corresponding ones of the multiple computing devices. The processor component of each of the multiple computing devices then transmits a representation of the portion of the copula function that it just fit (e.g., corresponding ones of the copula data 434a-x) to the coordinating device (e.g., the coordinating device 500). Each of these representations of a portion of the copula function includes an indication of a likelihood function and a gradient of a corresponding one of the portions of the random sample with respect to coefficients of the copula function.

At 2370, the processor component of each of the multiple computing devices makes a check as to whether new coefficients are received from the coordinating device for another iteration of fitting the portion of the copula function. If so, then another fitting of the portion of the copula function and another transmission of a representation thereof occur at 2360. However, if no new coefficients are received at 2370 associated with that copula function, then a check is made at 2380 as to whether there is another copula form for which a copula function is to be fitted. If so, then the fitting of another copula function for another copula form begins at 2360.

Figure 9:
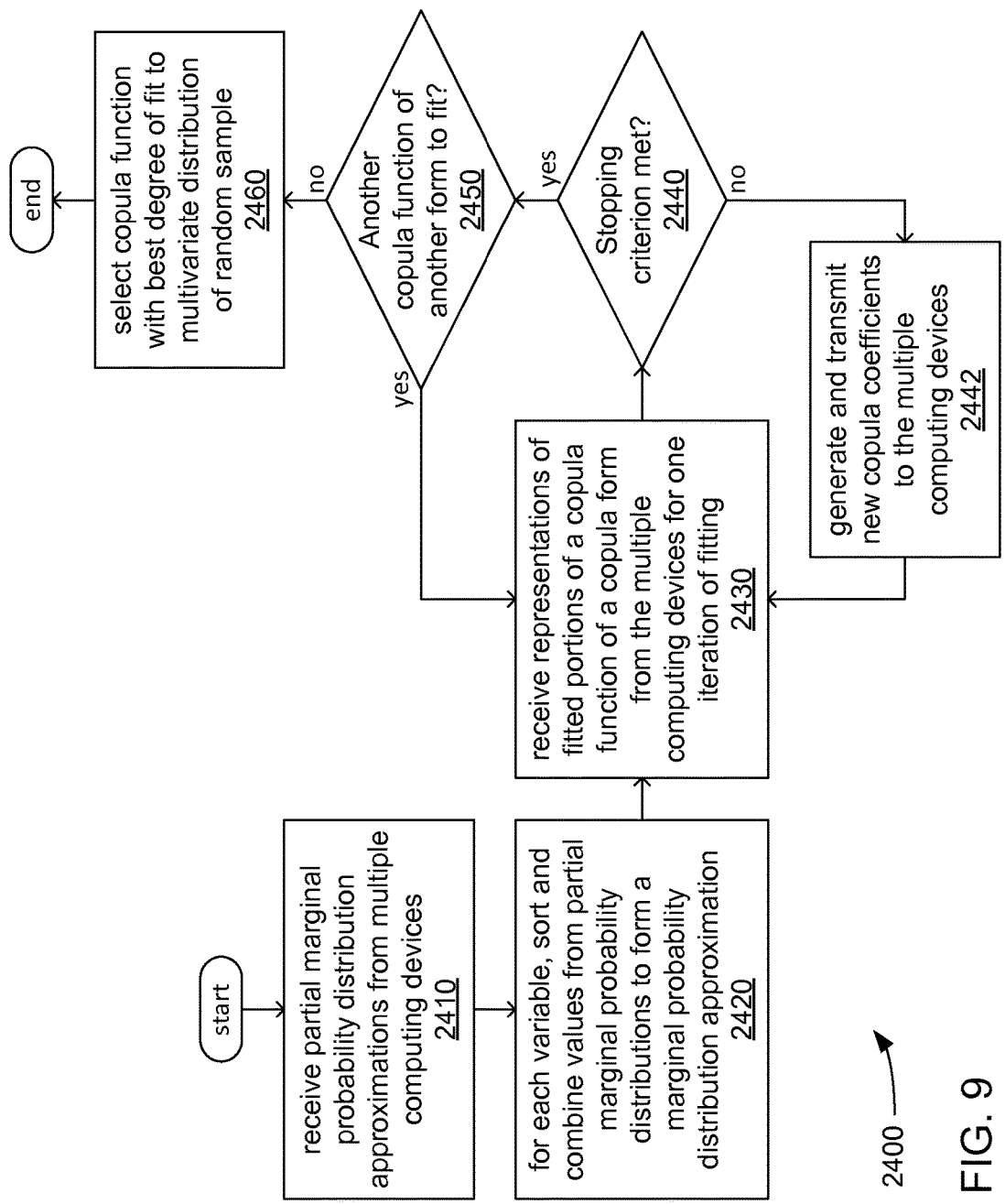
FIG. 9 illustrates an embodiment of a logic flow of generating a sample representation from marginal data and copula data.

FIG. 9 illustrates an embodiment of a logic flow 2400. The logic flow 2400 may be representative of some or all of the operations executed by one or more embodiments described herein. More specifically, the logic flow 2400 may illustrate operations performed by the processor component 550 in executing the control routine 540, and/or performed by other component(s) of at least the coordinating device 500 in generating the sample representation 530 from at least the marginal data 432a-x and the copula data 434a-x.

At 2410, partial marginal probability distribution approximations (e.g., the marginal data 432a-x) associated with variables of a random sample are received at a coordinating device (e.g., the coordinating device 500) from multiple other computing devices (e.g., the multiple computing devices 300*a-x*). As previously discussed, each of the partial marginal probability distribution approximations are made up of values that either represent a fitted empirical distribution function or quantiles taken of the values representing a fitted empirical distribution function.

At 2420, for each variable of the random sample, the processor component of the coordinating device (e.g., the processor component 550 of the coordinating device 500) sorts and combines the values of the partial marginal probability distribution approximations to form a single marginal probability distribution approximation. As has been discussed, the values of the partial marginal probability distribution approximations may be accompanied by indices or other indication of ordering of those values based on an order of the draws within each portion of the random sample (e.g., one of the sample portions 339*a-x*) with which each partial marginal probability distribution approximation is associated. The processor component may employ such indices or other indication of ordering in any of a variety of sorting algorithms to order the values for all partial marginal probability distribution approximations associated with a variable as part of forming a single marginal probability distribution approximation for that variable.

At 2430, representations of fitted portions of a copula function of a copula form (e.g., the copula data 434*a-x*) are received at the coordinating device (e.g., the coordinating device 500) from the multiple computing devices (e.g., the multiple computing devices 300*a-x*) for one iteration of fitting of those portions of that copula function by the multiple computing devices. As previously discussed, each such representation of a portion of a copula may include an indication of a likelihood function and of a gradient of the portion of the random sample with which the portion of the copula function is associated with respect to coefficients of the copula function.

At 2440, coefficients of the copula are analyzed to determine whether criterion for stopping performance of iterations of fitting of portions of the copula function by the multiple computing devices has been met. If not, then the processor component of the coordinating device derives and transmits new coefficient values to the multiple computing devices to use in another iteration of fitting portions of the copula function to the multivariate distribution of the random sample.

However, if the criterion is met, then a check is made at 2450 of whether there is another copula form for which a copula function is to be fitted. If so, then the fitting of another copula function for another copula form begins, and representations of fitted portions of that other copula should be received at the computing device from the multiple other computing devices at 2430.

However, if there are no more copula functions of other copula forms remaining to be fitted, then the processor component of the coordinating device (e.g., the processor component 550 of the coordinating device 500) selects from among the copula functions that have been so fitted a copula function having the best degree of fit to the multivariate distribution of the random sample.

Figure 10:
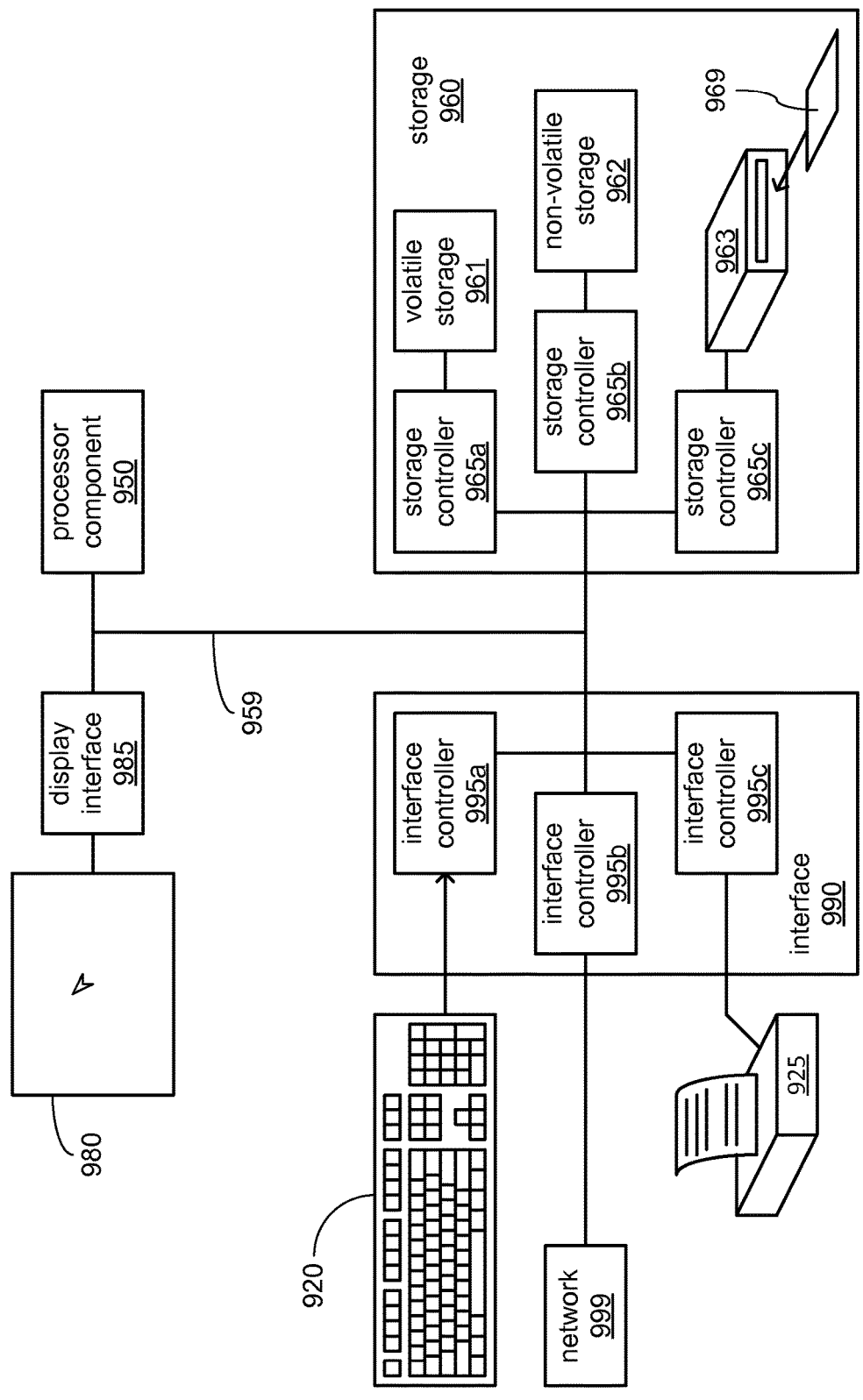
FIG. 10 illustrates an embodiment of a processing architecture.

FIG. 10 illustrates an embodiment of a processing architecture 3000 suitable for implementing various embodiments as previously described. More specifically, the processing architecture 3000 (or variants thereof) may be implemented as part of one or more of the computing devices 100, 300, 500 or 700. It should be noted that components of the processing architecture 3000 are given reference numbers in which the last two digits correspond to the last two digits of reference numbers of at least some of the components earlier depicted and described as part of the computing devices 100, 300, 500 and 700. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information over the communications media. The information can be implemented as transmissions allocated to one or more electrical and/or optical conductors. A message (including, for example, a command, status, address or data message) may be one of such transmissions or may be a plurality of such transmissions, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a touch screen 980 incorporating a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which commands and/or data are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 350 and 550) may include any of a wide variety of commercially available processors, employing any of a wide variety of technologies and implemented with one or more cores physically combined in any of a number of ways.

As previously discussed, the storage 960 (corresponding to the storages 160, 360, 560 and 760) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as including multiple distinct types of storage is in recognition of the commonplace use of more than one type of storage device in computing devices in which one type provides relatively rapid reading and writing capabilities enabling more rapid manipulation of data by the processor component 950 (but in which a "volatile" technology may be used constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (which may correspond to the interfaces 190, 390, 590 or 790) may employ any of a variety of communications technologies corresponding to any of a variety of communications technologies that may be employed to communicatively couple a computing device to one or more other devices. Again, one or both of various forms of wired or wireless communications may be employed to enable the processor component 950 to interact with input/output devices (e.g., the depicted example keyboard 920 or printer 925) and/or other computing devices, where such interaction may be through a network (e.g., the network 999) or an interconnected set of networks. In recognition of the often greatly different character of multiple types of timings and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data provided by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, corresponding to the display 780), such a computing device implementing the processing architecture 3000 may also include the display interface 985. Although more generalized types of interface may be employed in communicatively coupling to a display (whether of the touch screen variety, or not), the somewhat specialized additional processing often required in visually displaying various forms of content on a display, as well as the somewhat specialized nature of the cabling-based interfaces used, often makes the provision of a distinct display interface desirable. Wired and/or wireless communications technologies that may be employed by the display interface 985 in a communicative coupling of the touch screen 980 may make use of timings and/or protocols that conform to any of a variety of industry standards, including without limitation, any of a variety of analog video interfaces, Digital Video Interface (DVI), DisplayPort, etc.

Some systems may use Hadoop®, an open-source framework for storing and analyzing big data in a distributed computing environment. Some systems may use cloud computing, which can refer to a model for enabling ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster. Apache™ Hadoop® is an open-source software framework for distributed computing. Some systems may use the SAS® LASR™ Analytic Server, which can deliver statistical modeling and machine learning capabilities in a highly interactive programming environment that enables multiple users to concurrently manage data, transform variables, perform exploratory analysis, build and compare models and score with virtually little regards on the size of the data stored in Hadoop®. Some systems may use SAS In-Memory Statistics for Hadoop® to read big data once and analyze it several times by persisting it in-memory for the entire session.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-program product tangibly embodied in a non-transitory machine-readable storage medium, the computer-program product including instructions operable to cause a first computing device of a plurality of computing devices to perform operations including:

generate a first sample portion of a single random sample from a single posterior probability distribution at least partially in parallel with at least a second computing device of the plurality of computing devices, wherein:

the second computing device generates a second sample portion of the single random sample from the single posterior distribution; and the single random sample comprises a plurality of sample portions that comprises the first sample portion and the second sample portion;

fit an empirical distribution function to a marginal probability distribution of a variable within the first sample portion of the single random sample to derive a first partial marginal probability distribution approximation of a plurality of partial marginal probability distribution approximations at least partially in parallel with the second computing device, wherein:

the second computing device fits the empirical distribution function to a marginal probability distribution of the variable within the second sample portion of the single random sample to derive a second partial marginal probability distribution approximation of the plurality of partial marginal probability distribution approximations;

transmit the first partial marginal probability distribution approximation to a coordinating device at least partially in parallel with the second computing device, wherein:

the second computing device transmits the second partial marginal probability distribution approximation to the coordinating device; and the coordinating device generates a marginal probability distribution approximation of the single random sample from the plurality of partial marginal probability distribution approximations transmitted to the coordinating device at least partially in parallel by the plurality of computing devices;

fit a first portion of a copula function of a plurality of portions of the copula function to a multivariate probability distribution of the first sample portion of the single random sample to generate a first likelihood contribution of a plurality of likelihood contributions at least partially in parallel with the second computing device, wherein:

the second computing device fits a second portion of the plurality of portions of the copula function to a multivariate probability distribution of the second sample portion of the single random sample to generate a second likelihood contribution of the plurality of likelihood contributions;

transmit an indication of the first likelihood contribution of the first sample portion to the coordinating device at least partially in parallel with the second computing device, wherein:

the second computing device transmits an indication of the second likelihood contribution of the second sample portion to the coordinating device; and the coordinating device determines whether the fit of the copula function, performed as the fit of the plurality of portions of the copula function by the plurality of computing devices, meets a predetermined criterion for generation of a reduced size representation of the single random sample that achieves a predetermined degree of fit of the copula function based on the marginal probability distribution approximation and based on the plurality of likelihood contributions to determine whether the fit of the copula function is to be repeated; and in response to receipt of copula coefficients generated and transmitted by the coordinating device in response to a determination by the coordinating device that the fit of the copula function is to be repeated, perform an iteration of operations at least partially in parallel with the second computing device, each iteration comprising:

repeat the fitting of the first portion of the copula function to the multivariate probability distribution of the first sample portion based on the copula coefficients to repeat generation of the first likelihood contribution of the first sample; and repeat the transmission of the indication of the first likelihood contribution of the first sample portion to the coordinating device to enable the coordinating device to again determine whether the fit of the copula function meets the predetermined criterion to again determine whether the fit of the copula function is to be again repeated by the plurality of computing devices in another iteration.

2. The computer-program product of claim 1, the first computing device caused to perform operations to reduce a quantity of data exchanged between the first computing device and the coordinating device, the operations including:

compare a quantity of draws of parameters within at least the first sample portion to a threshold quantity of draws;

select the empirical distribution function as the first partial marginal probability distribution approximation associated with the variable based on the quantity of draws within at least the first sample portion exceeding the threshold; and select quantiles taken of the empirical distribution function as the first partial marginal probability distribution approximation based on the quantity of draws within at least the first sample portion not exceeding the threshold.

3. The computer-program product of claim 1, wherein the first computing device caused to perform operations including:

combine the first partial marginal probability distribution approximation with at least the second partial marginal probability distribution approximation to generate the marginal probability distribution approximation; and combine the first portion of the copula function with at least the second portion of the copula function to generate the copula function.

4. The computer-program product of claim 3, the first computing device caused to perform operations including:

derive an inverse cumulative distribution function (ICDF) of the marginal probability distribution approximation; and employ at least the inverse marginal CDF, the copula function and a random number generator to generate a simulated random sample as a representation of the random sample, wherein the simulated random sample is smaller in size than the random sample, and wherein the simulated random sample and the random sample have at least one similar statistical characteristic.

5. The computer-program product of claim 3, the first computing device caused to perform operations including:

derive a prior probability distribution from the marginal probability distribution approximation and the copula function; and perform another Bayesian analysis using the prior probability distribution.

6. The computer-program product of claim 3, the first computing device caused to perform operations including:

derive an inverse marginal CDF of the marginal probability distribution approximation; and employ at least the inverse marginal CDF and the copula function as a representation of the random sample in an analysis of a statistical characteristic of the random sample.

7. The computer-program product of claim 3, the first computing device caused to perform operations including transmit at least the marginal probability distribution approximation and the copula function to another computing device as a representation of the random sample.

8. The computer-program product of claim 1, wherein the first computing device caused to exchange communications with at least the second computing device to coordinate generation of the single posterior probability distribution among the plurality of computing devices.

9. A computer-implemented method comprising:

generating, on a first computing device of a plurality of computing devices, a first sample portion of a single random sample from a single posterior probability distribution at least partially in parallel with at least a second computing device of the plurality of computing devices, wherein:

the second computing device generates a second sample portion of the single random sample from the single posterior distribution; and the single random sample comprises a plurality of sample portions that comprises the first sample portion and the second sample portion;

fitting, on the first computing device, an empirical distribution function to a marginal probability distribution of a variable within the first sample portion of the single random sample to derive a first partial marginal probability distribution approximation of a plurality of partial marginal probability distribution approximations at least partially in parallel with the second computing device, wherein:

the second computing device fits the empirical distribution function to a marginal probability distribution of the variable within the second sample portion of the single random sample to derive a second partial marginal probability distribution approximation of the plurality of partial marginal probability distribution approximations;

transmitting, from the first computing device, the first partial marginal probability distribution approximation to a coordinating device at least partially in parallel with the second computing device, wherein:

the second computing device transmits the second partial marginal probability distribution approximation to the coordinating device; and the coordinating device generates a marginal probability distribution approximation of the single random sample from the plurality of partial marginal probability distribution approximations transmitted to the coordinating device at least partially in parallel by the plurality of computing devices;

fitting, on the first computing device, a first portion of a copula function of a plurality of portions of the copula function to a multivariate probability distribution of the first sample portion of the single random sample to generate a first likelihood contribution of a plurality of likelihood contributions at least partially in parallel with the second computing device, wherein:

the second computing device fits a second portion of the plurality of portions of the copula function to a multivariate probability distribution of the second sample portion of the single random sample to generate a second likelihood contribution of the plurality of likelihood contributions;

transmitting, from the first computing device, an indication of the first likelihood contribution of the first sample portion to the coordinating device at least partially in parallel with the second computing device, wherein:

the second computing device transmits an indication of the second likelihood contribution of the second sample portion to the coordinating device; and the coordinating device determines whether the fit of the copula function, performed as the fit of the plurality of portions of the copula function by the plurality of computing devices, meets a predetermined criterion for generation of a reduced size representation of the single random sample that achieves a predetermined degree of fit of the copula function based on the marginal probability distribution approximation and based on the plurality of likelihood contributions to determine whether the fit of the copula function is to be repeated; and in response to receipt of copula coefficients generated and transmitted by the coordinating device in response to a determination by the coordinating device that the fit of the copula function is to be repeated, performing an iteration of operations at least partially in parallel with the second computing device, each iteration comprising:

repeating, on the first computing device, the fitting of the first portion of the copula function to the multivariate probability distribution of the first sample portion based on the copula coefficients to repeat generation of the first likelihood contribution of the first sample; and repeating, on the first computing device, the transmission of the indication of the first likelihood contribution of the first sample portion to the coordinating device to enable the coordinating device to again determine whether the fit of the copula function meets the predetermined criterion to again determine whether the fit of the copula function is to be again repeated by the plurality of computing devices in another iteration.

10. The computer-implemented method of claim 9, comprising operations to reduce a quantity of data exchanged between the first computing device and the coordinating device, the operations comprising:

comparing, on the first computing device, a quantity of draws of parameters within at least the first sample portion to a threshold quantity of draws;

selecting, on the first computing device, the empirical distribution function as the first partial marginal probability distribution approximation associated with the variable based on the quantity of draws within at least the first sample portion exceeding the threshold; and selecting, on the first computing device, quantiles taken of the empirical distribution function as the first partial marginal probability distribution approximation based on the quantity of draws within at least the first sample portion not exceeding the threshold.

11. The computer-implemented method of claim 9, comprising:

combining, on the first computing device, the first partial marginal probability distribution approximation with at least a second partial marginal probability distribution approximation to generate the marginal probability distribution approximation; and combining, on the first computing device, the first portion of the copula function with at least the second portion of the copula function to generate the copula function.

12. The computer-implemented method of claim 11, comprising:

deriving, on the first computing device, an inverse cumulative distribution function (ICDF) of the marginal probability distribution approximation; and employing, on the first computing device, at least the inverse marginal CDF, the copula function and a random number generator to generate a simulated random sample as a representation of the random sample, wherein the simulated random sample is smaller in size than the random sample, and wherein the simulated random sample and the random sample have at least one similar statistical characteristic.

13. The computer-implemented method of claim 11, comprising:

deriving, on the first computing device, a prior probability distribution from the marginal probability distribution approximation and the copula function; and performing another Bayesian analysis using the prior probability distribution.

14. The computer-implemented method of claim 11, comprising:

deriving, on the first computing device, an inverse marginal CDF of the marginal probability distribution approximation; and employing at least the inverse marginal CDF and the copula function as a representation of the random sample in an analysis of a statistical characteristic of the random sample.

15. The computer-implemented method of claim 11, comprising transmitting, from the first computing device, at least the marginal probability distribution approximation and the copula function to another computing device as a representation of the random sample.

16. The computer-implemented method of claim 9, exchanging, on the first computing device, communications with at least the second computing device to coordinate generation of the single posterior probability distribution among the plurality of computing devices.

17. An apparatus comprising a processor and a storage to store instructions that, when executed by the processor, cause the processor to perform operations comprising:

generate, on a first computing device of a plurality of computing devices, a first sample portion of a single random sample from a single posterior probability distribution at least partially in parallel with at least a second computing device of the plurality of computing devices, wherein:

the second computing device generates a second sample portion of the single random sample from the single posterior distribution; and the single random sample comprises a plurality of sample portions that comprises the first sample portion and the second sample portion;

fit, on the first computing device, an empirical distribution function to a marginal probability distribution of a variable within the first sample portion of the single random sample to derive a first partial marginal probability distribution approximation of a plurality of partial marginal probability distribution approximations at least partially in parallel with the second computing device, wherein:
the second computing device fits the empirical distribution function to a marginal probability distribution of the variable within the second sample portion of the single random sample to derive a second partial marginal probability distribution approximation of the plurality of partial marginal probability distribution approximations;
transmit, from the first computing device, the first partial marginal probability distribution approximation to a coordinating device at least partially in parallel with the second computing device, wherein:
the second computing device transmits the second partial marginal probability distribution approximation to the coordinating device; and
the coordinating device generates a marginal probability distribution approximation of the single random sample from the plurality of partial marginal probability distribution approximations transmitted to the coordinating device at least partially in parallel by the plurality of computing devices;
fit, on the first computing device, a first portion of a copula function of a plurality of portions of the copula function to a multivariate probability distribution of the first sample portion of the single random sample to generate a first likelihood contribution of a plurality of likelihood contributions at least partially in parallel with the second computing device, wherein:
the second computing device fits a second portion of the plurality of portions of the copula function to a multivariate probability distribution of the second sample portion of the single random sample to generate a second likelihood contribution of the plurality of likelihood contributions;
transmit, from the first computing device, an indication of the first likelihood contribution of the first sample portion to the coordinating device at least partially in parallel with the second computing device, wherein:
the second computing device transmits an indication of the second likelihood contribution of the second sample portion to the coordinating device; and
the coordinating device determines whether the fit of the copula function, performed as the fit of the plurality of portions of the copula function by the plurality of computing devices, meets a predetermined criterion for generation of a reduced size representation of the single random sample that achieves a predetermined degree of fit of the copula function based on the marginal probability distribution approximation and based on the plurality of likelihood contributions to determine whether the fit of the copula function is to be repeated; and
in response to receipt of copula coefficients generated and transmitted by the coordinating device in response to a determination by the coordinating device that the fit of the copula function is to be repeated, performing an iteration of operations at least partially in parallel with the second computing device, each iteration comprising:
repeat, on the first computing device, the fitting of the first portion of the copula function to the multivariate probability distribution of the first sample portion based on the copula coefficients to repeat generation of the first likelihood contribution of the first sample; and
repeat, on the first computing device, the transmission of the indication of the first likelihood contribution of the first sample portion to the coordinating device to enable the coordinating device to again determine whether the fit of the copula function meets the predetermined criterion to again determine whether the fit of the copula function is to be again repeated by the plurality of computing devices in another iteration.

18. The apparatus of claim 17, wherein the processor is caused to perform operations to reduce a quantity of data exchanged between the first computing device and the coordinating device, the operations including:
compare, on the first computing device, a quantity of draws of parameters within at least the first sample portion to a threshold quantity of draws;
select, on the first computing device, the empirical distribution function as the first partial marginal probability distribution approximation associated with the variable based on the quantity of draws within at least the first sample portion exceeding the threshold; and
select, on the first computing device, quantiles taken of the empirical distribution function as the first partial marginal probability distribution approximation based on the quantity of draws within at least the first sample portion not exceeding the threshold.

19. The apparatus of claim 17, wherein
the processor is caused to perform operations including:
combine, on the first computing device, the first partial marginal probability distribution approximation with at least the second partial marginal probability distribution approximation to generate the marginal probability distribution approximation; and
combine, on the first computing device, the first portion of the copula function with at least the second portion of the copula function to generate the copula function.

20. The apparatus of claim 19, wherein the processor is caused to perform operations including:
derive, on the first computing device, an inverse cumulative distribution function (ICDF) of the marginal probability distribution approximation; and
employ, on the first computing device, at least the inverse marginal CDF, the copula function and a random number generator to generate a simulated random sample as a representation of the random sample, wherein the simulated random sample is smaller in size than the random sample, and wherein the simulated random sample and the random sample have at least one similar statistical characteristic.

21. The apparatus of claim 19, wherein the processor is caused to perform operations including:
derive, on the first computing device, a prior probability distribution from the marginal probability distribution approximation and the copula function; and
perform, on the first computing device, another Bayesian analysis using the prior probability distribution.

22. The apparatus of claim 19, wherein the processor is caused to perform operations including:
derive, on the first computing device, an inverse marginal CDF of the marginal probability distribution approximation; and
employ, on the first computing device, at least the inverse marginal CDF and the copula function as a representation of the random sample in an analysis of a statistical characteristic of the random sample.

23. The apparatus of claim 19, wherein the processor is caused to perform operations including transmit, from the first computing device, at least the marginal probability distribution approximation and the copula function to another computing device as a representation of the random sample.

24. The apparatus of claim 17, wherein the processor is caused to, at the first computing device, exchange communications with at least the second computing device to coordinate generation of the single posterior probability distribution among the plurality of computing devices.

* * * * *